(12) United States Patent
Maeda

(10) Patent No.: US 8,437,703 B2
(45) Date of Patent: *May 7, 2013

(54) RADIO COMMUNICATION APPARATUS, RADIO COMMUNICATION SYSTEM, AND RADIO COMMUNICATION METHOD WITH CHARACTERISTIC DATA EXTRACTION

(75) Inventor: Koji Maeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 510 days.

This patent is subject to a terminal disclaimer.

(21) Appl. No.: 12/728,786

(22) Filed: Mar. 22, 2010

(65) Prior Publication Data

US 2010/0248761 A1  Sep. 30, 2010

(30) Foreign Application Priority Data

Mar. 26, 2009  (JP) .................................. 2009-076963

(51) Int. Cl.
*H04B 17/00* (2006.01)
(52) U.S. Cl.
USPC ........................ 455/69; 455/67.11; 455/115.1
(58) Field of Classification Search .................. None
See application file for complete search history.

(56) References Cited

U.S. PATENT DOCUMENTS

| | | |
|---|---|---|
| 2006/0209746 A1 | 9/2006 | Asai et al. |
| 2008/0026704 A1 | 1/2008 | Maeda et al. |
| 2009/0298439 A1* | 12/2009 | Choi et al. ................. 455/67.11 |
| 2010/0054352 A1* | 3/2010 | Huttunen et al. ............. 375/260 |

FOREIGN PATENT DOCUMENTS

| | | |
|---|---|---|
| JP | 2006-222665 | 8/2006 |
| JP | 2007-195175 | 8/2007 |
| JP | 2008-61214 | 3/2008 |

OTHER PUBLICATIONS

David Gesbert, et al., "Shifting the MIMO Paradigm", IEEE Signal Processing Magazine, (Multiterminal Communication Systems), Sep. 2007, pp. 36-46.

Paul D. Sutton, et al., "Cyclostationary Signatures in Practical Cognitive Radio Applications", IEEE Journal on Selected Areas in Communications, vol. 26, No. 1, Jan. 2008, pp. 13-24.

* cited by examiner

*Primary Examiner* — Philip Sobutka
(74) *Attorney, Agent, or Firm* — Oblon, Spivak, McClelland, Maier & Neustadt, L.L.P.

(57) ABSTRACT

A radio communication apparatus includes a characteristic data extraction unit receiving a radio signal from one or more radio stations and calculating characteristic data representing a waveform characteristic indicating statistical properties of the received signal; a characteristic data determination unit determining at least one characteristic data based on one or more calculated characteristic data; a signal generation unit converting a signal for a radio transmission into a signal having a format corresponding to the determined characteristic data, and generating a transmission signal having a characteristic waveform based on the characteristic data; and a transmission unit transmitting the transmission signal.

15 Claims, 28 Drawing Sheets

FIG.19

| ADDITIVE CHARACTERISTIC DATA | NUMBER OF STATIONS USING ADDITIVE CHARACTERISTIC DATA (SAME CHARACTERISTIC DATA USING STATION NUMBER DATA) |
|---|---|
| $C_1$ | $N(C_1) = 10$ |
| $C_2$ | $N(C_2) = 3$ |
| $C_3$ | $N(C_3) = 7$ |
| $C_4$ | $N(C_4) = 5$ |
| ...... | ...... |

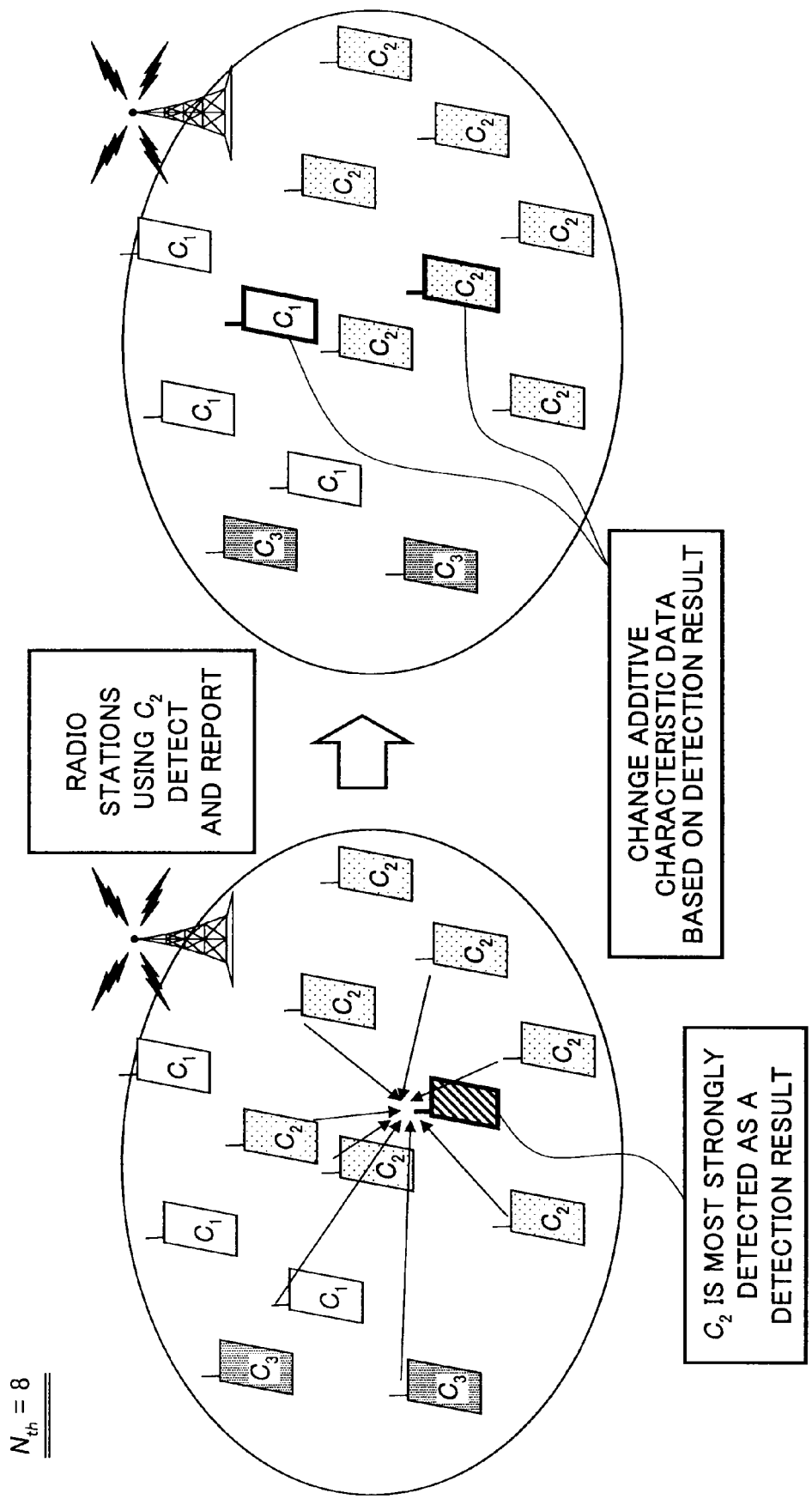

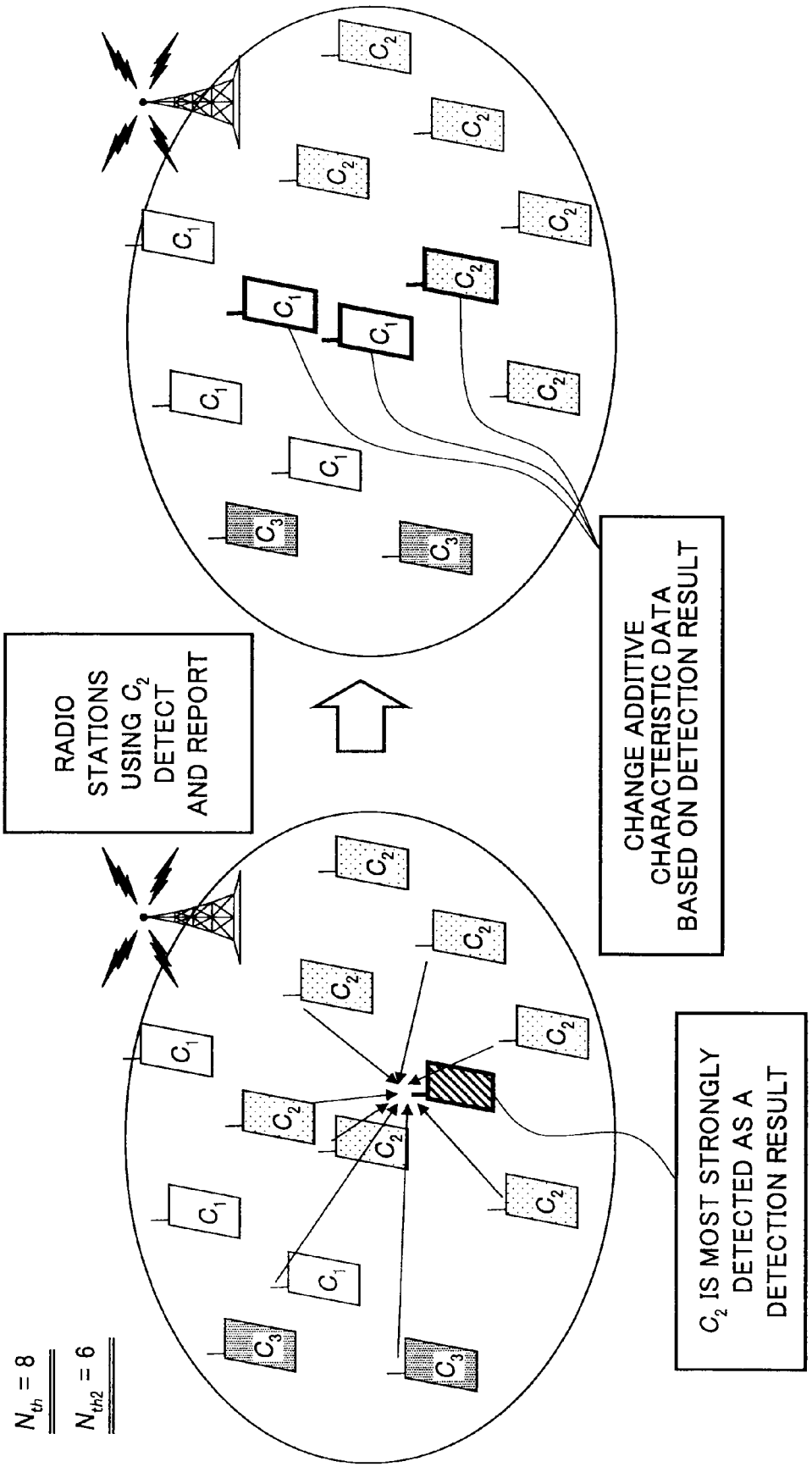

RADIO COMMUNICATION APPARATUS, RADIO COMMUNICATION SYSTEM, AND RADIO COMMUNICATION METHOD WITH CHARACTERISTIC DATA EXTRACTION

BACKGROUND OF THE INVENTION

1. Field of the Invention

The present invention generally relates to a radio communication apparatus, a radio communication system, and a radio communication method using waveform characteristic data indicating signal statistic properties.

2. Description of the Related Art

In a radio communication system, when a radio station communicates, it is important for the radio station to control interference with other nearby radio stations. More specifically, it is required to prevent mutual communication interference between the radio stations by reducing the interference power level affecting other nearly radio stations to be equal to or less than the allowable upper limit value, so as to ensure a predetermined number of available radio stations in a radio communication system and prevent the degradation of the frequency use efficiency.

One exemplary method of controlling such interference is a frequency reuse method, in which the use frequency bands are designed to be allocated in advance in a manner such that the base stations adjacent to each other surely use different use frequency bands from each other. In this method, the base station is not allowed to use any use frequency bands other than the designated user frequency band determined in the design of the use frequency band.

FIG. 1 schematically illustrates the frequency reuse method. In this method, the use frequency bands are determined by centralized control for the entire service area of the radio communication system or a group having a predetermined number or more of cells. By using this method, it may become possible to sufficiently reduce the probability of causing communication failure. In the example of FIG. 1, the frequency bands $f_1$ and $f_2$ are allocated to the base stations $1a$ and $1b$, respectively. Further, the base station $1a$ communicates with the terminals $2a$ and $2c$, and the base station $1b$ communicates with the terminals $2b$ and $2d$. In this case, a signal transmitted from the base station $1a$ arrives not only in the area of the base station $1a$ but also at the terminal $2b$ located in the area of the base station $1b$. However, due to the different use frequency bands (i.e., $f_1$ and $f_2$), the signal from the base station $1a$ may not seriously interfere the communication of the terminal $2b$. However, if this method is used, when the number of repetition is increased (i.e., the number of areas using the same use frequency band (hereinafter may be simplified as frequency) is increased) it may become difficult to perform flexible use of the frequencies, and the frequency use efficiency per unit area may be degraded.

There is another interference control method in which plural base stations are so worked together as to be virtually regarded as antennas disposed at geographically dispersed locations. By using the plural virtual antennas (base stations), the MIMO (Multi-Input Multi-output) communications (Multi-user MIMO) are performed; thereby enabling reducing the interferences and intending high-speed and large-capacity communication system (see, for example, D. Gesbert, M. Kountouris, R. W. Heath, Jr., C. B. Chae, and T. Salzer, "Shifting the MIMO Paradigm: From Single User to Multiuser Communications", IEEE Signal Processing Magazine, vol. 24, no. 5, pp. 36-46, October 2007).

FIG. 2 shows a radio communication system in which the interference control is performed based on the multi-user MIMO concept. In this method, the interference control is performed while the plural base stations are worked together. Because using this method, it may become possible to sufficiently reduce the interference power level. Further, it is not necessary to reuse frequencies; therefore, higher frequency use efficiency may be achieved. In the example of FIG. 2, the base stations $1c$ and $1d$ are connected to a common network including a signal transmission/receiving control section. The signal transmission/receiving control section performs control on and determines the transmission signals of the base stations. By doing this, these base stations are virtually regarded as plural antennas which are disposed geographically dispersed locations. As a result, the same use frequency band may be shared by all the base stations and terminals. However, when the number of base stations is large, a large number of calculations are to be required to perform the control and the like. Further, in this method, very accurate information on the propagation paths between the terminals and base stations may be necessary. Because of this feature, a large scale of equipment change may be required to implement this method.

On the other hand, another method may be thought in which a terminal having received a signal collects information of the received signal, and analyses a communication status. Then, based on the analysis result, the terminal determines a signal-transmission parameter to be advantageous for the terminal, and performs communications based on the parameter. Otherwise, there may be still another method in which the terminal determines a signal-transmission parameter to achieve a desired communication quality (i.e., desired qualities such as communication rate, error rate or the like), and perform communications based on the parameter. Herein, those methods may also be called environment-recognition type interference control methods.

FIG. 3 shows a radio communication system in which the environment-recognition type interference control is performed. In the example of FIG. 3, before the communications of the base station $1e$ and the terminal $2k$, the base station $1e$ and terminals $2i$ and $2k$ detect and analyze the respective radio environments. More specifically, the base station $1e$ and terminals $2i$ and $2k$ monitor the respective receiving signals and detect available use frequency band. In this case, based on the respective received signals, if the terminals $2i$ and $2k$ can identify the transmission source in the signal component of the received signal, it may become possible to perform communication while accurately avoiding the mutual interference.

Namely, in the example of FIG. 3, the base station $1e$ and the terminal $2k$ receive a signal from the terminal $2j$, but does not receive a signal from the terminal $2l$ because the terminal $2l$ is located at a geographically separated location. In the same manner, the terminal $2i$ does not receive signals from the terminals $2j$ and $2l$. In this case, even if the frequency $f1$ used in the communications between the base station $1f$ and the terminal $2l$ is used in the communications between the base station $1e$ and the terminal $2k$, it may become possible to sufficiently reduce the possibility of interference with the communications of the terminal $2l$. Therefore, by using the frequency $f1$ in the communications between the base station $1e$ and the terminal $2k$, the same frequency may be shared between base stations adjacent to each other; thereby improving the frequency use efficiency. Further, in this method, the radio communication parameters such as use frequency band is locally controlled in the base stations and terminals. Because of this feature, it may not necessarily required to perform a large number of calculations, and a relatively smaller scale of equipment change may be enough to implement this method.

In an environment-recognition type interference control method, it may become important to recognize where the radio station of the transmission source indicated in the signal component of the received signal is geographically located. To that end, in one method, the received signal at the terminal may be decoded to collect information of the transmission source. In another method, the information of the transmission source may be collected based on the characteristic data indicating statistic properties of the waveform of the received signal.

In the method of collecting the information based on the decoding of the signal, much information on the transmission source and the signal of the transmission source may be obtained at a time. However, when the power level of the signal to be decoded to collect the information is as low as to be buried in noise level, it may become difficult to collect the information. Further, under the conditions that the plural radio communication system are being used at the same time, the same number of decoders as that of types of the signal formats in the receiving signals may become necessary. Because of this feature, when the number of types of the signal formats is increased, the circuit scale of the stations may be accordingly increased. Further, when plural signals are received in the same frequency band at the same time, those signals may interfere with each other. In this case, even the signal power level is sufficiently greater than the noise level, the decoding process may not be properly performed.

On the other hand, in the method of collecting the information based on the characteristic data, the information of the characteristic data may be derived by calculating a predetermined statistics data of the received signal. In this method, even in an environment where plural signal formats are present at the same time, the information may be collected by using the same operation circuit. Therefore, this method may be advantageous because the circuit scale of the stations may avoid becoming too large. Further, this method may be advantageous because a signal buried in noise may also be detected by continually monitoring the signal at a predetermined time period, and because even plural signals are present at the same time, the information on the plural signals may be collected at the same time. The method of colleting the information based on the characteristic data in the signal is described in, for example, Japanese Patent Application Publication No. 2006-222665, where as the predetermined statistics data (value), a periodic autocorrelation (value) is used. However, in the method of colleting the information based on the characteristic data, an amount of the characteristic data obtained at one time is limited, and it may not be easy to obtain more information than that indicating whether the signal is detected or not upon the receipt of a signal. This is because, what can be obtained in this method is limited to the information extracted without decoding the received signal. Because of this feature, it may not be possible to extract information indicating "a parameter used in the signal (such as identification information of identifying the transmission source of the signal)". Further, when plural transmission sources use the same parameter, it may be difficult to obtain information of those transmission sources.

In contrast, there is still another method capable of enhancing communication capacity of the entire areas, in which a radio station intentionally adds statistic properties to the transmission signal so that the waveform of the transmission signal from the radio station has a specific characteristic data; and plural radio station use plural characteristic data so that the communication capacity of the entire areas is enhanced (see, for example, Japanese Patent Application Publication No. 2008-061214, and P. D. Sutton, K. E. Nolan, and L. E. Doyle, "Cyclostationary Signature in Practical Cognitive Radio Applications," IEEE Journal on Selected Areas in Communications(JSAC), Vol. 26, no. 1. pp 13-24, 2008). For example, by adding characteristic data dedicated to each station, it may become possible to determine the transmission source of the signal received by a radio station. As a result, by using this environment-recognition type interference control method, it may become possible to perform highly-accurate interference control.

However, in this environment-recognition type interference control method, as the number of types of characteristic data is increased, a recognition rate (i.e., probability to succeed in detection) of the characteristic data intentionally added may be reduced. Because of this feature, it may be necessary to limit the number of types of the characteristic data to be equal to or less than a predetermined number. However, when such a limitation is imposed, it may become difficult to allocate each dedicated characteristic data to all the radio stations; namely, the same characteristic data may have to be allocated to plural radio stations. If this is the case, as described above, it may become difficult to identify the transmission source based on the characteristic data. From the viewpoints of increasing the recognition rate of the characteristic data between the radio stations adjacent to each other, the characteristic data may be randomly added to the base stations. In this case, however, the radio stations to which the same characteristic data is added are disposed at geographically dispersed locations in various areas. Because of this feature, when signals are received at a certain point, the received signals including various types of (or all types of) characteristic data having non-negligible power level are more likely to be detected. In this case, if a radio station (observing station) tries to start communication at the certain point, the radio station may determine to refrain from starting the communications based on the detection that all the characteristic data may be being used.

FIG. 4 shows a case where various characteristic data $C_1$, $C_2$, and $C_3$ are being used among various radio stations which are dispersedly distributed. There are many terminals distributed within the service area of the base station $1g$. Further, the base station $1g$ communicates with the terminals $2m$, $2n$, and $2o$ using the use frequency bands $f_1$, $f_2$, and $f_3$, respectively; and the terminals $2m$, $2n$, and $2o$ use the characteristic data $C_1$, $C_2$, and $C_3$, respectively. Further, it is assumed that only three types of characteristic data $C_1$, $C_2$, and $C_3$ can be used. Any of the characteristic data $C_1$, $C_2$, and $C_3$ is allocated to each of the terminals within the service area of the base station $1g$. Under the conditions, an observing station 3 observes the signals transmitted from the nearby terminals $2n$, $2p$, $2q$, and $2r$. Those nearby terminals $2n$, $2p$, $2q$, and $2r$ use characteristic data $C_2$, $C_3$, $C_1$, and $C_1$, respectively. Therefore, the observing station 3 detects all the values of the characteristic data $C_2$, $C_3$, $C_1$, and $C_1$, to be equal to or greater than a threshold value.

In this case, the observing station 3 determines that any of the characteristic data $C_1$, $C_2$, and $C_3$ cannot be used; namely, the observing station 3 determines that any of the use frequency bands $f_1$, $f_2$, and $f_3$ cannot be used. This is because of the concern that if the observing station 3 determines to use, for example, the use frequency band $f_1$ which is used in (allocated to) the communications between the base station $1g$ and the terminals having the characteristic data $C_1$ within the service area of the base station $1g$, the communications of the observing station 3 using the frequency band $f_1$ may interfere the communications of the nearby terminals using the characteristic data $C_1$ (i.e., terminals $2r$ and $2q$).

However, the terminals $2m$ and $2o$ communicating with the base station $1g$ are disposed far from the observing station 3. Therefore, if it is assumed that the terminals $2r$ and $2q$ use not the characteristic data $C_1$ but any of the characteristic data $C_2$ or $C_3$, the characteristic data $C_1$ may not be strongly detected by the observing station 3. In this case, the observing station 3 may determine that, if the observing station 3 uses the frequency band $f_1$ which is used for the terminals using the characteristic data $C_1$ (i.e., in this case, the terminal $2m$), the probability of interfering the communications of the terminal $2m$ may be relatively small. As described above, if the characteristic data and the use frequency bands can be appropriately determined (adjusted), the observing station 3 may start communication. However, in such a case as shown in FIG. 4, the observing station 3 may have to determine that any of the characteristic data $C_1$, $C_2$, and $C_3$ (i.e., any of the frequency bands $f_1$, $f_2$, and $f_3$) cannot be used. As a result, use opportunity of radio resources may be lost, which is not desirable from the viewpoints of effective use of frequencies.

SUMMARY OF THE INVENTION

According to an embodiment of the present invention, there may be provided a radio communication system, a radio communication apparatus, and radio communication method capable of deriving characteristic data of a waveform based on statistics properties of a signal so as to effectively use radio resources.

According to one aspect of the present invention, there is provided a radio communication apparatus including a characteristic data extraction unit receiving a radio signal from one or more radio stations and calculating characteristic data representing a waveform characteristic indicating statistical properties of the received signal; a characteristic data determination unit determining at least one characteristic data based on one or more calculated characteristic data; a signal generation unit converting a signal for a radio transmission into a signal having a format corresponding to the determined characteristic data, and generating a transmission signal having a characteristic waveform based on the characteristic data; and a transmission unit transmitting the transmission signal.

BRIEF DESCRIPTION OF THE DRAWINGS

Other objects, features, and advantages of the present invention will become more apparent from the following description when read in conjunction with the accompanying drawings, in which:

FIG. 19 is a conceptual table in which data indicating the number of terminals using the same characteristic data stored in a same characteristic data using station number counting unit according to the second modification of the second embodiment of the present invention;

FIG. 27 is a drawing showing a concept and an effect of determining the additive characteristic data according to the fifth modification of the second embodiment of the present invention; and FIG. 28 is a drawing showing a concept and an effect of determining the additive characteristic data according to a seventh modification of the second embodiment of the present invention.

Figure 1:
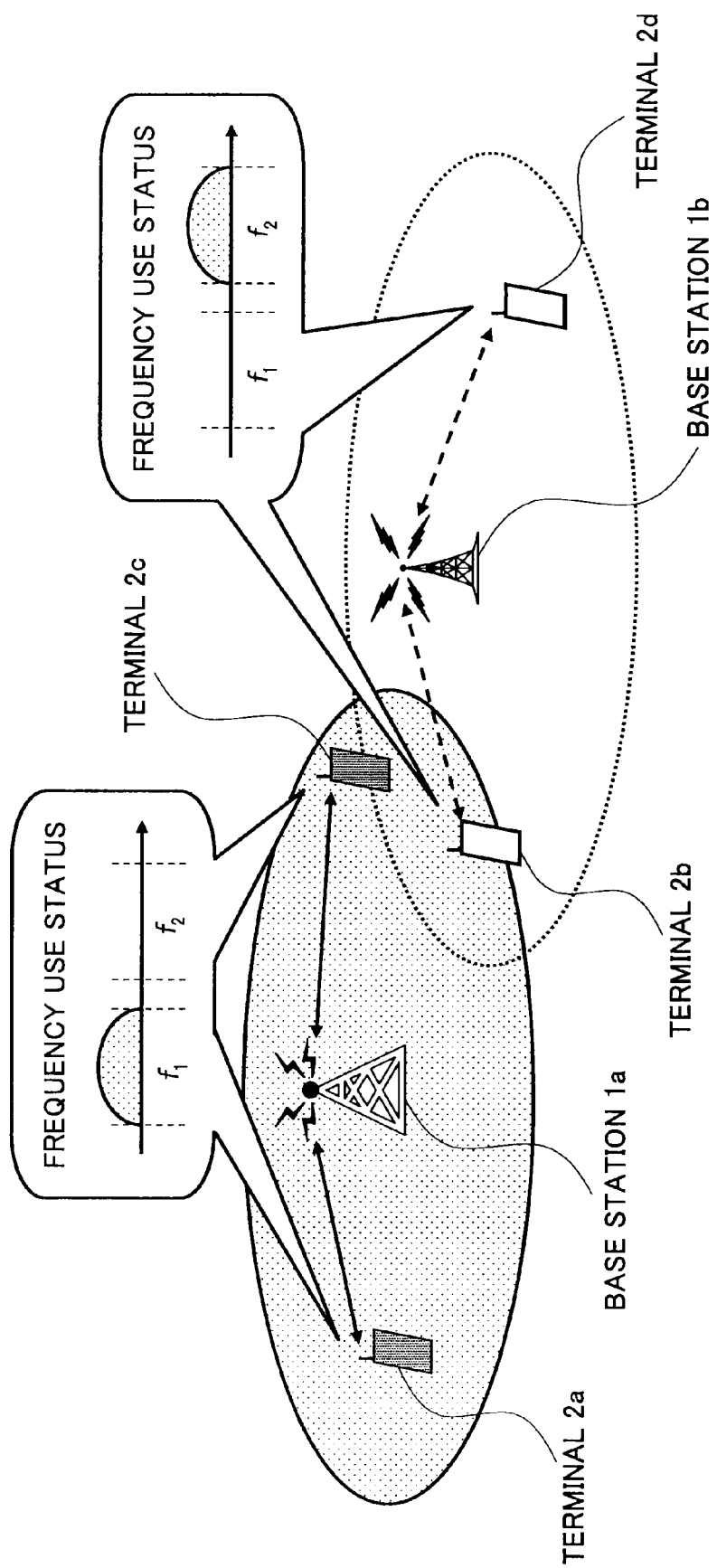
FIG. 1 is a conceptual drawing showing a radio communication system in which interference control based on a frequency reuse method is performed.
Figure 2:
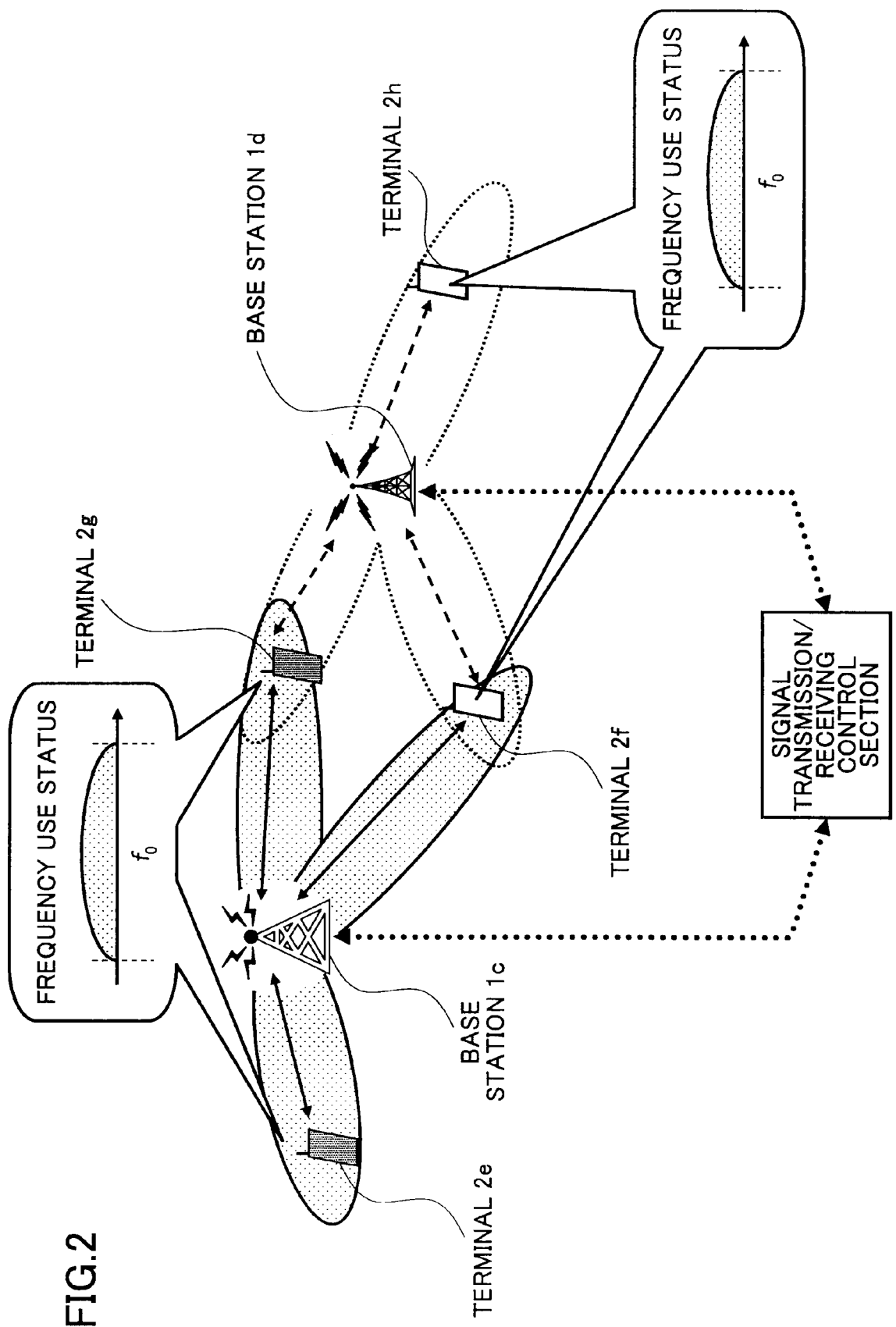
FIG. 2 is a conceptual drawing showing a radio communication system using a multi-user MIMO method where plural base stations are worked together.
Figure 3:
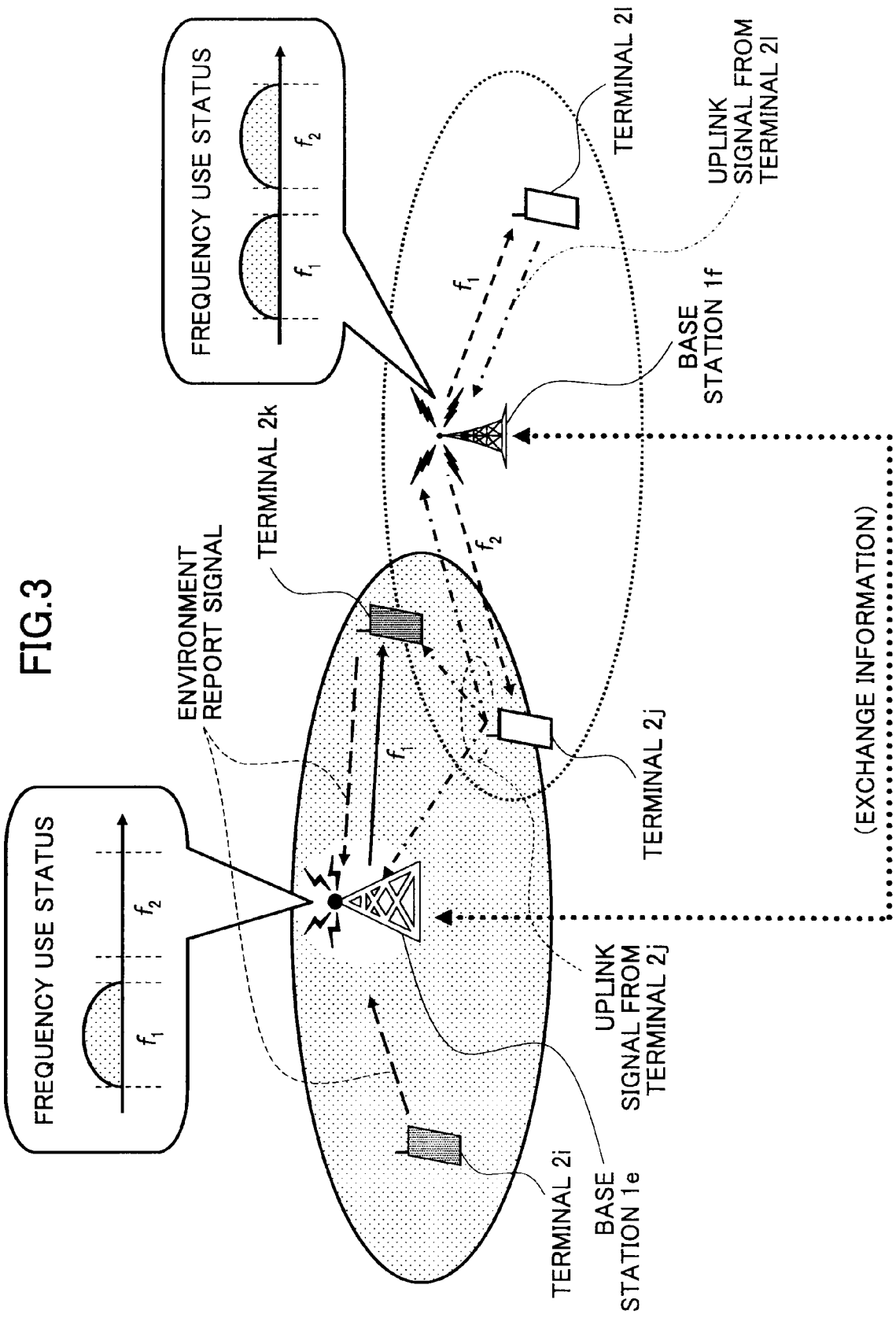
FIG. 3 is a conceptual drawing showing a radio communication system using an environment-recognition type interference control method.

DESCRIPTION OF THE PREFERRED EMBODIMENTS (1) A radio transmission/receiving apparatus according to an embodiment of the present invention includes
- a characteristic data extraction unit extracting characteristic data of a waveform (hereinafter simplified as "characteristic data") of a signal received from a nearby radio station (hereinafter simplified as "received signal");
- a characteristic adding unit adding a predetermined characteristic data to a transmission signal (hereinafter simplified as "additive characteristic data");
- an additive characteristic data determination unit determining the additive characteristic data based on the characteristic data of the received signal, the characteristic data being extracted by the characteristic data extraction unit; and
- a characteristic data control unit controlling the characteristic adding unit based on the additive characteristic data determined by the additive characteristic data determination unit.

By having this configuration, based on a predetermined interference control policy, it may become possible to dispose the radio station in a manner such that the radio stations in the same area have the same characteristic data or the radio stations having the same characteristic data are disposed at geographically diverse locations. Upon a communication request, by monitoring the characteristic data by the radio stations, The interference control may be easily and highly accurately conducted.

(2) Further, in the radio transmission/receiving apparatus, the additive characteristic data determination unit may select the characteristic data having the highest energy from among the various extracted characteristic data from the received signals, and determine the selected characteristic data as the additive characteristic data.

By doing in this way, it may become possible to intensively dispose the radio stations using the same characteristic data in a predetermined area, so that the geographical conditions may be associated with the characteristic data. As a result, when it is determined as the interference control policy that a use frequency band (hereinafter may be simplified as "frequency") is geographically and aggressively reused to an extent that the reuse of the frequency does not interfere the communications of nearby radio stations, the characteristic data used in an area geographically far from a predetermined area may not be detected in the predetermined area.

In this case, when a frequency used by a radio station disposed in the area geographically far from the predetermined area is reused in a radio station disposed in the predetermined area, it may be estimated that the reuse of the frequency may not interfere the communications of the radio station disposed in the area geographically far from the predetermined area. In this case, the characteristic data which is not detected in the predetermined area is allocated to the radio station disposed in the area geographically far from the predetermined area. Therefore, by reusing the frequency in this way, it may become possible to enhance the frequency use efficiency per unit area.

(3) Further, in the radio transmission/receiving apparatus, the additive characteristic data determination unit may select the characteristic data having the lowest energy from among the various extracted characteristic data from the received signals, and determine the selected characteristic data as the additive characteristic data.

By doing in this way, it may become possible to prevent the radio stations using the same characteristic data from being intensively disposed. Further, it may become possible to achieve an interference control policy to prevent generation of the communications by the nearby radio stations in the predetermined area and achieve interference control policy ensuring to perform high-priority communications.

(4) A radio communication system according to an embodiment of the present invention includes plural radio stations and opposing radio stations communicating with each of the radio stations (hereinafter simplified as "opposing radio station(s)").

The radio station includes
- a characteristic data extraction unit extracting characteristic data of a waveform (hereinafter simplified as "characteristic data") of a signal received from a nearby radio station (hereinafter simplified as "received signal");
- a collection information generation unit generating a collection information of the characteristic data to be reported to the opposing radio station, the characteristic data having been extracted from the received signal by the characteristic data extraction unit;
- a characteristic adding unit adding a predetermined characteristic data to a transmission signal (hereinafter simplified as "additive characteristic data"); and
- a characteristic data control unit controlling the characteristic adding unit based on the additive characteristic data determined by the opposing radio station.

The opposing radio station include
- an additive characteristic data determination unit determining the additive characteristic data based on the collection information reported from the radio station, the collection information including the characteristic data of the received signal in the radio station; and
- a control signal generation unit generating control information based on the additive characteristic data determined by the additive characteristic data determination unit.

In this configuration, the characteristic data control unit of the radio station controls the characteristic adding unit based on the additive characteristic data determined by the additive characteristic data determination unit of the opposing radio station.

By having this configuration, within a coverage area of the opposing radio station, the numbers of the radio stations using the same characteristic data may be dispersed (included) based on respective specified percentages to avoid a case where all the radio stations located in a wide area use only specified characteristic data.

(5) A radio communication system according to an embodiment of the present invention includes plural radio stations and opposing radio stations communicating with each of the radio stations (hereinafter simplified as "opposing radio station(s)").

The radio station includes
- a characteristic data extraction unit extracting characteristic data of a waveform (hereinafter simplified as "characteristic data") of a signal received from a nearby radio station (hereinafter simplified as "received signal");
- a collection information generation unit generating a collection information of the characteristic data to be reported to the opposing radio station, the characteristic data having been extracted from the received signal by the characteristic data extraction unit;
- a characteristic adding unit adding a predetermined characteristic data to a transmission signal (hereinafter simplified as "additive characteristic data"); and
- a report signal extraction unit extracting information of an additive characteristic data from a report signal on the additive characteristic data; and
- a characteristic data control unit controlling the characteristic adding unit based on information of the additive characteristic data extracted from the report signal.

The opposing radio station include
- an additive characteristic data determination unit determining the additive characteristic data based on the collection information reported from the radio station, the collection information including the characteristic data of the received signal in the radio station; and
- an additive characteristic data report signal generation unit generating a report signal to report the information of the additive characteristic data determined by the additive characteristic data determination unit to the radio station.

In this configuration, report signal extraction unit of the radio station extracts the information of the additive characteristic data from the report signal on the additive characteristic data from the opposing radio station; and the characteristic data control unit of the radio station controls the characteristic adding unit based on the additive characteristic data extracted from the report signal from the opposing radio station.

By having this configuration, within a coverage area of the opposing radio station, it may become possible to appropriately determine the characteristic data to be used in the radio station based on comprehensive evaluations including peripheral environment of the opposing radio station.

(6) Further, in the radio communication system, the additive characteristic data determination unit may select a characteristic data having the highest energy from among the various characteristic data on the received signals at the radio station, the various characteristic data being reported from the radio station, and determine the selected characteristic data as the additive characteristic data.

By doing in this way, it may become possible to intensively dispose the radio stations using the same characteristic data in a predetermined area, so that the geographical conditions may be associated with the characteristic data. As a result, high-level interference control may be conducted.

(7) Further, in the radio communication system, the additive characteristic data determination unit may select a characteristic data having the lowest energy from among the various characteristic data on the received signals at the radio station, the various characteristic data being reported from the radio station, and determine the selected characteristic data as the additive characteristic data.

By doing in this way, it may become possible to prevent the radio stations using the same characteristic data from being intensively disposed. Further, it may become possible to achieve an interference control policy to prevent generation of the communications by the nearby radio stations in the predetermined area and achieve interference control policy ensuring to perform high-priority communications.

(8) Further, the opposing radio station of the radio communication system may further include a station number counting unit (same characteristic data using station number counting unit) counting the number of the radio stations using the same additive characteristic data for each characteristic data, the radio stations being located nearby the opposing radio station (hereinafter may be referred to as "same-characteristic-data using station number"). By having this configuration, by using the obtained relationship between the characteristic data and the number of radio stations using the characteristic data, it may become possible to determine the additive characteristic data in a manner such that the number of the radio stations using a specific characteristic data is much greater or less than the number of the radio station using other characteristic data to avoid a case where only a specific characteristic data is used among the radio stations.

(9) Further, in the radio communication system, it may be preferable that the additive characteristic data determination unit may select the characteristic data having the highest energy from among the characteristic data having the same-characteristic-data using station number equal to or less than a predetermined number, and determine the selected characteristic data as the additive characteristic data.

By doing in this way, the radio station may use the characteristic data which is most strongly detected by the radio station provided that the number of the radio stations using the same characteristic data is equal to or less than the predetermined number. Therefore, it may become possible to associate the geographical conditions with the characteristic data. As a result, it may become possible to enhance the frequency use efficiency per unit area.

(10) Further, in the radio communication system, it may be preferable that the additive characteristic data determination unit may select the characteristic data having the lowest energy from among the characteristic data having the same-characteristic-data using station number equal to or less than a predetermined number, and determine the selected characteristic data as the additive characteristic data.

By doing in this way, provided that the number of the radio stations using the same characteristic data is equal to or less than the predetermined number, it may become possible to prevent the radio stations using the same characteristic data from being intensively disposed. Further, it may become possible to achieve an interference control policy to prevent generation of the communications by the nearby radio stations in the predetermined area and achieve interference control policy ensuring to perform high-priority communications.

(11) Further, it may be preferable that the opposing radio station of the radio communication system may further include an order signal transmission unit, when the same-characteristic-data using station number of a first characteristic data is equal to or more than a predetermined number, transmitting an order signal to the radio station connecting the opposing radio station and using the first characteristic data as the additive characteristic data to extract the characteristic data from the received signal again and report the extraction result to the opposing radio station.

By having this feature, when the number of the radio stations using the same characteristic data is equal to or more than the predetermined number, based on the extraction result, by causing the radio station to use another characteristic data, the same-characteristic-data using station number of all the characteristic data may be leveled. As a result, it may become possible to enhance the accuracy of the interference control.

(12) Further, it may be preferable that, when the same-characteristic-data using station number of a first characteristic data is equal to or more than a predetermined number, the order signal transmission unit of the opposing radio station in the radio communication system may transmit the order signal not only to the radio station connecting the opposing radio station and using the first characteristic data as the additive characteristic data but also to the radio station connecting the opposing radio station and using a second characteristic data as the additive characteristic to extract the characteristic data from the received signal again and report the extraction result to the opposing radio station, the same-characteristic-data using station number of the second characteristic data is equal to or more than a second predetermined number less than the predetermined number.

By having this feature, it may become possible to avoid the case where, as a result of the re-extraction of the characteristic data and re-allocation of the additive characteristic data when the same-characteristic-data using station number of a first characteristic data is equal to or more than a predetermined number, the re-extraction of the characteristic data and re-allocation of the additive characteristic data never terminated.

(13) Further, in the radio communication system, it may be preferable that the additive characteristic data determination unit may select the characteristic data having the highest energy from among the characteristic data having the same-characteristic-data using station number equal to or less than a predetermined number, and determine the selected characteristic data as the additive characteristic data.

By doing in this way, based on the re-calculation result of the characteristic data, it may become possible to appropriately select the additive characteristic data of the base stations in accordance with the communication environments which vary over time.

(14) Further, in the radio communication system, it may be preferable that the additive characteristic data determination unit may specify the characteristic data, a number of the radio stations using the characteristic data exceeding a predetermined number, compare energy levels of the specified characteristic data among the radio stations, select a second predetermined number of radio stations having higher energy levels from among the radio stations corresponding to the specified characteristic data, allocate the specified characteristic data to the selected second predetermined number of the radio stations, and allocates another characteristic data having higher energy level to radio stations other than the second predetermined number of the radio stations. By doing in this way, it may become possible to change the additive characteristic data of the radio station which may not be much influenced when the additive characteristic data is changed because the energy level of all the characteristic data is small. Therefore, it may become possible to more appropriately allocate the characteristic data in the system.

(15) Further, in the radio communication system, it may be preferable that the additive characteristic data determination unit may specify the characteristic data, a number of the radio stations using the characteristic data exceeding a predetermined number, compare energy levels of the specified characteristic data among the radio stations, select a second predetermined number of radio stations having lower energy levels from among the radio stations corresponding to the specified characteristic data, allocate the specified characteristic data to the selected second predetermined number of the radio stations, and allocates another characteristic data having higher energy level to radio stations other than the second predetermined number of the radio stations. By doing in this way, it may become possible to allocate the characteristic data to the radio station that is among the second predetermined number of the radio stations and that detects strong energy level of the characteristic data allocated to relatively smaller number of radio stations. Because of this feature, it may become possible to disperse the characteristic data used in a certain area and avoid a situation where specific character data are not used.

(16) Further, in the radio communication system, it may be preferable that the additive characteristic data determination unit may specify first characteristic data, a number of radio stations using the first characteristic data being equal to or greater than a first predetermined number, specify second characteristic data other than the first characteristic data, a number of radio stations using the second characteristic data being equal to or less than a second predetermined number, calculate a energy ratio normalized by using the energy level of the first characteristic data and the energy level of the second characteristic data for each radio station, select the second predetermined number of radio stations having higher values of the energy ratio from among the radio stations using the first characteristic data, allocate the first characteristic data to the selected second predetermined number of radio stations, and allocate characteristic data to radio stations other than the second predetermined number of radio stations, the characteristic data having highest energy level among the second characteristic data. By using the energy ratio between the energy of the first characteristic data and the energy of the second characteristic data, it may become possible to avoid a situation where the additive characteristic data is changed simply because the energy of the second characteristic data is relatively strongly detected by the radio station in a certain area even though the first characteristic data is very strongly detected. Further, by changing the additive characteristic data of the radio station which may not be much influenced when the additive characteristic data of the radio station is changed, the radio station strongly detecting the latter energy or detecting both energy at similar levels. Therefore, it may become possible to more appropriately allocate the characteristic data in the system.

(17) Further, in the radio communication system, it may be preferable that the predetermined number may be determined based on a total number of radio stations that communicate with the opposing radio stations and a number of types of the characteristic data measured by the radio station. By doing this, it may become possible to average the numbers of radio stations using the same characteristic data in a predetermined area and associate the geographical relational positions and the characteristic data, thereby enabling performing highly-accurate interference control.

As described above, according to an embodiment of the present invention, when the radio station bury the characteristic data in the transmission signal and the radio station and other radio station detect the characteristic data to perform interference control, the characteristic data may be associated with geographical positions. Thereby, it may become possible to perform highly-accurate interference control.

Figure 5:
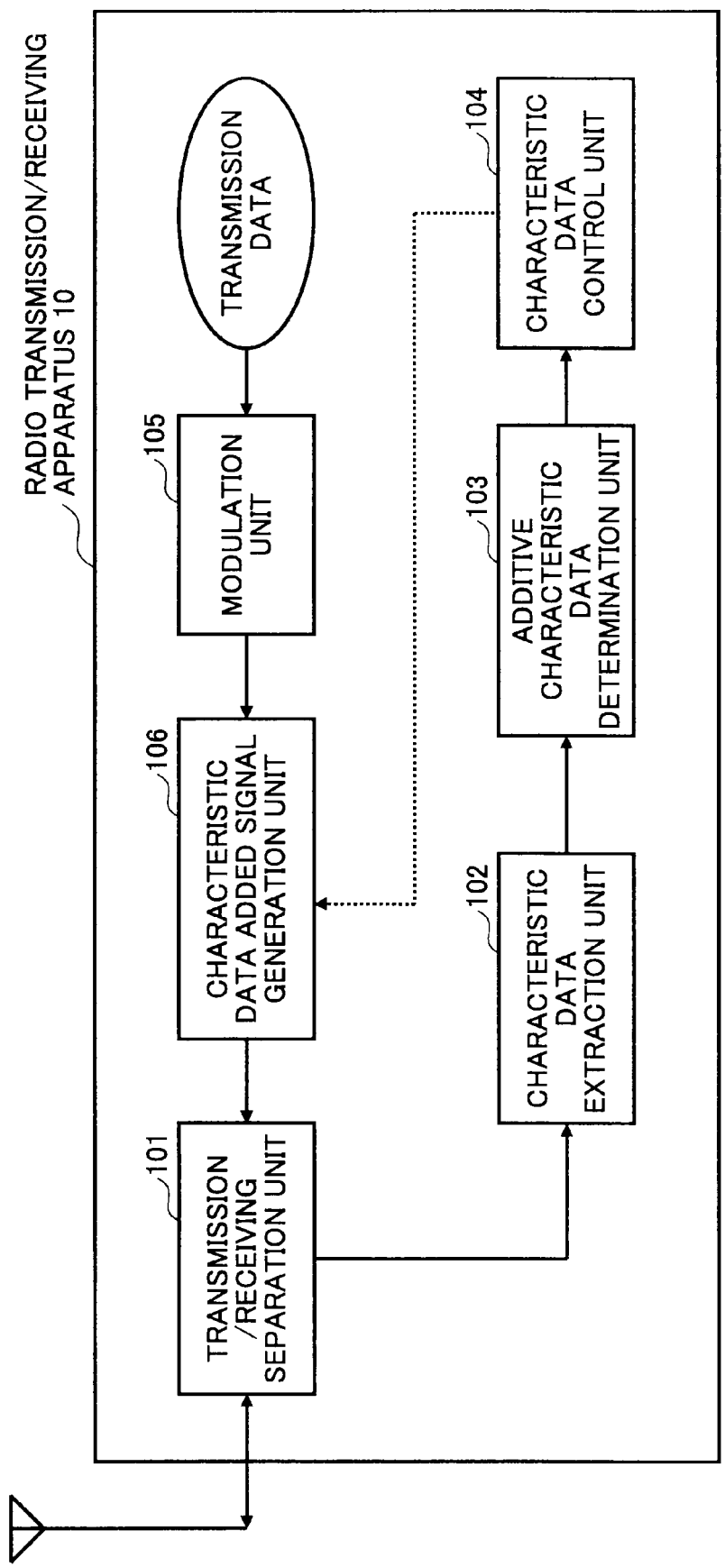
FIG. 5 is a block diagram showing an exemplary functional configuration of a radio transmission/receiving apparatus according to a first embodiment of the present invention.

Next, embodiments of the present invention are described based on the following procedure.
1. First embodiment
1.1 Configuration of radio transmission/receiving apparatus
1.2 Characteristic data
1.3 Operations
1.4 Effect
1.5 Modification 2. Second embodiment
2.1 System
2.2 Configurations of radio station and opposing radio station
2.3 Operations
2.4 Effect
2.5 Modifications
2.5.1 First modification
2.5.2 Second modification
2.5.3 Third modification
2.5.4 Fourth modification
2.5.5 Fifth modification
2.5.6 Sixth modification
2.5.7 Seventh modification 1. First Embodiment 1.1 Configuration of Radio Transmission/Receiving Apparatus FIG. 5 is a block diagram showing an exemplary functional configuration of a radio transmission/receiving apparatus 10. As shown in FIG. 5, the radio transmission/receiving apparatus 10 includes a transmission/receiving separation unit 101, a characteristic data extraction unit 102, an additive characteristic data determination unit 103, a characteristic data control unit 104, a modulation unit 105, and a characteristic data added signal generation unit 106.

In the following, those elements of the radio transmission/receiving apparatus 10 are described with reference to FIG. 5.

The transmission/receiving unit separation 101 receives a signal from outside of the transmission/receiving separation unit 101 via an antenna, and transfers the signal to the characteristic data extraction unit 102. In this functional block of FIG. 5, for simplification and explanatory purposes, units to be generally included in the radio transmission/receiving apparatus such as a frequency conversion unit, an amplifier, and a frequency limiting unit are omitted. Obviously, similar to a general radio transmission/receiving apparatus, it is assumed that such units are included in the radio transmission/receiving apparatus 10.

The characteristic data extraction unit 102 extracts and calculates characteristic data of the received signal transferred from the transmission/receiving separation unit 101. Herein, the term "characteristic data" represents a waveform characteristic indicating statistical properties of a signal, so that the "characteristic data" are included (embedded) in the waveform of the signal. As representative examples of the "characteristic data", characteristic data exhibiting cyclostationarity, entropy of a signal, power variance and the like may be used. More detail of the characteristic data is described below.

The characteristic data extraction unit 102 calculates a predetermined type of characteristic data extraction and calculates the energy of the characteristic data. It is assumed that the demodulation of a so-called modulation data signal included in the received signal is not performed at this stage. Namely, in this embodiment, it is not essential to demodulate the received signal in a case where the characteristic data is calculated.

The additive characteristic data determination unit 103 determines a characteristic data to be used (hereinafter may be referred to as an "additive characteristic data") by the radio transmission/receiving apparatus 10 based on a predetermined interference control policy.

Figure 6:
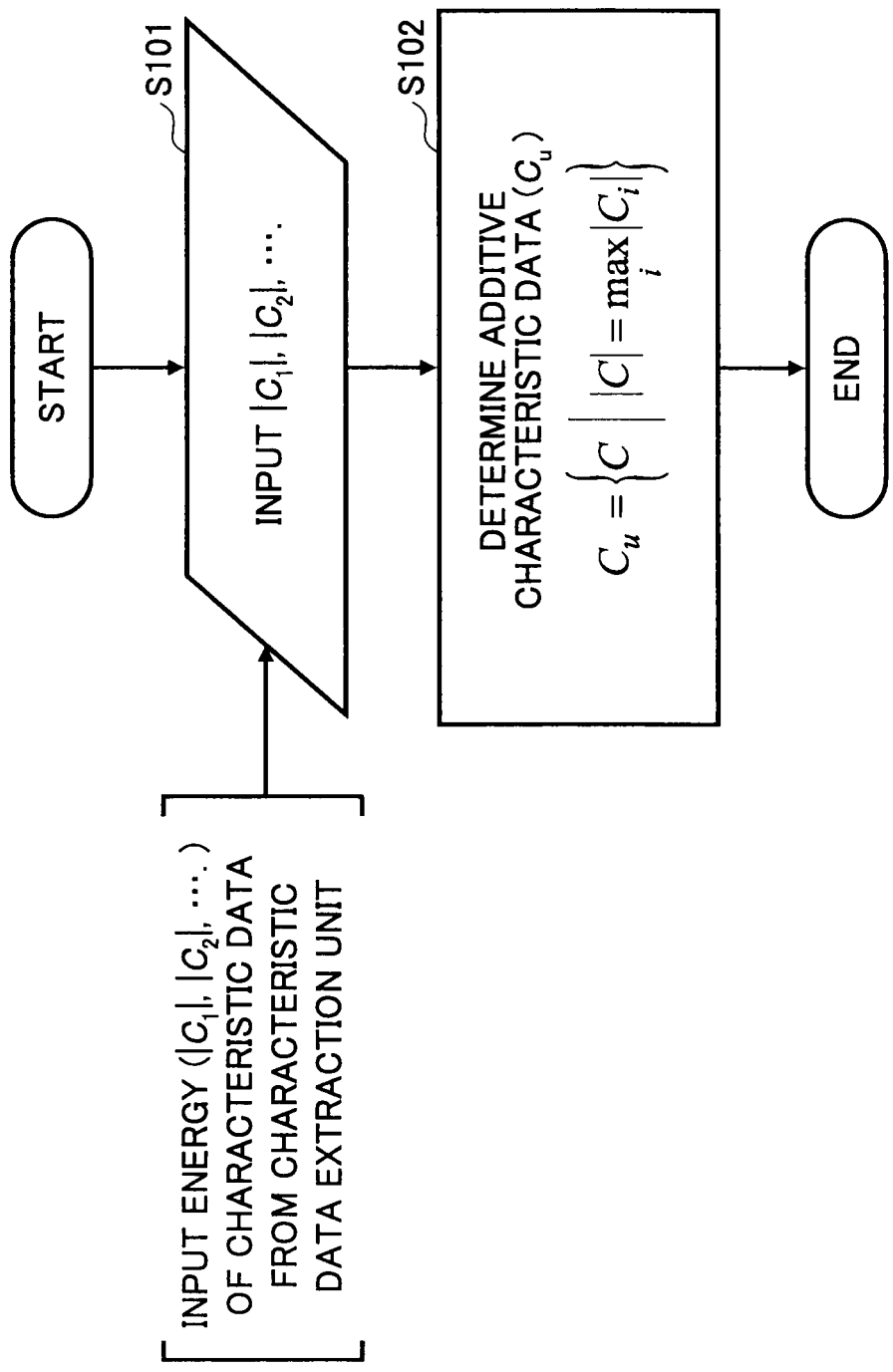
FIG. 6 is a flowchart showing a process of determining an additive characteristic data according to the first embodiment of the present invention.

FIG. 6 is a flowchart showing a process of determining the additive characteristic data. As shown in FIG. 6, first, the additive characteristic data determination unit 103 inputs (receives) energy (energy value) of plural characteristic data ($|C_1|, |C_2|, \ldots$) detected by the characteristic data extraction unit 102 (step S101). Then, the additive characteristic data determination unit 103 determines (selects) the characteristic data having the highest energy value as the additive characteristic data (step S102). In this case, the energy value may be expressed based on the power level.

Figure 7:
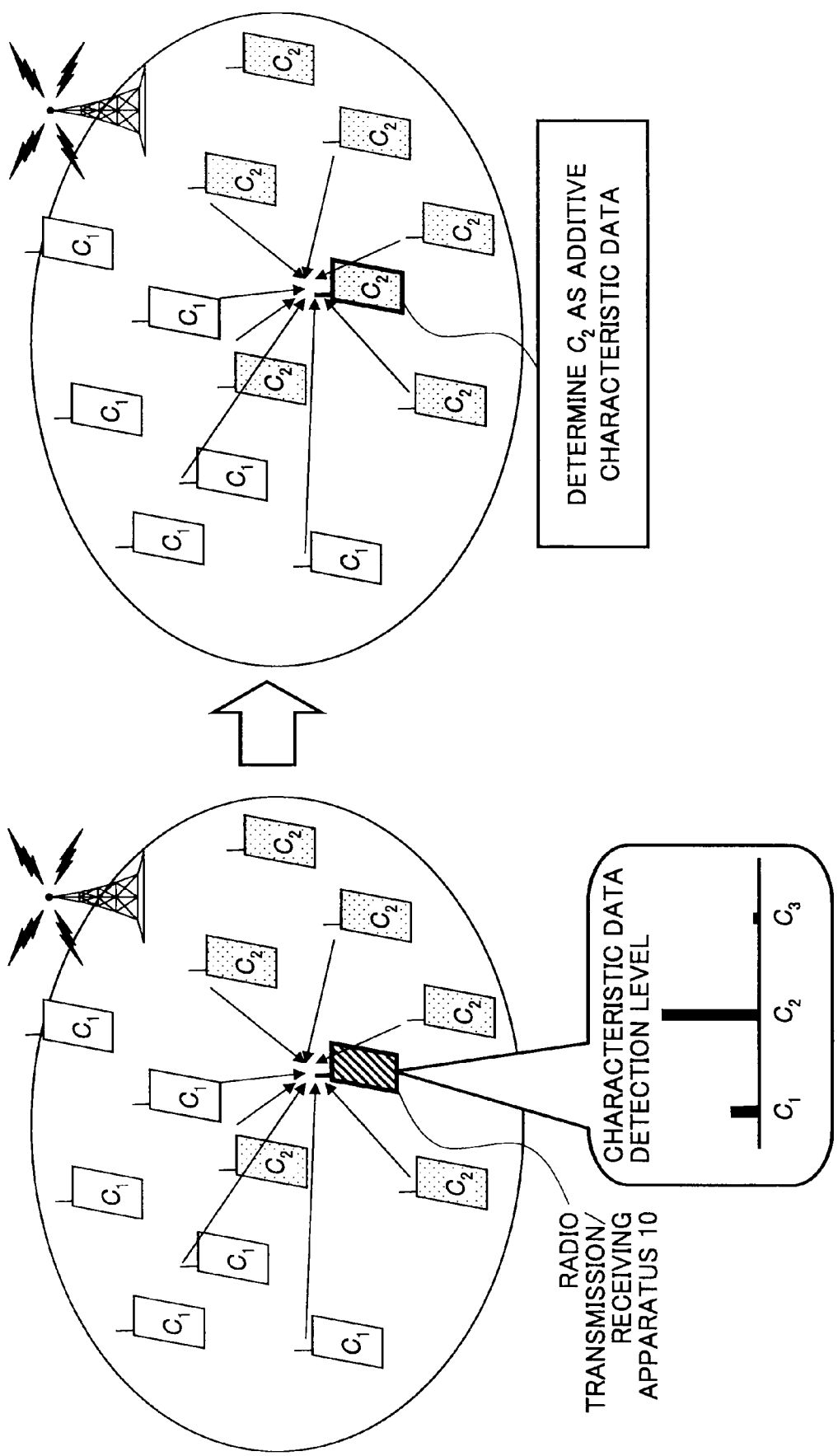
FIG. 7 is a drawing showing a concept and an effect of determining an additive characteristic data according to the first embodiment of the present invention.

FIG. 7 illustrates how the additive characteristic data is determined in this case. As shown in the left side of FIG. 7, the radio transmission/receiving apparatus 10 indicated in hatched lines receives signals from nearby radio stations. Then, it is assumed that the radio transmission/receiving apparatus 10 obtains measurement result of characteristic data $C_1$, $C_2$, and $C_3$. According to the flowchart in FIG. 6, the characteristic data $C_2$ is determined as the additive characteristic data. As a result of this determination, a use status of the characteristic data as described in the right side of FIG. 7 is formed. In such case, the closer the radio station is located to the radio transmission/receiving apparatus 10, the higher energy is more likely to be received from radio station by the radio transmission/receiving apparatus 10. When the characteristic data having the highest (or higher) energy is selected as shown in the flowchart of FIG. 6, the radio stations (terminals) may be geographically unevenly (locally) distributed within the target area.

The characteristic data control unit 104 controls the characteristic data added signal generation unit 106 in a manner such that the additive characteristic data determined by the additive characteristic data determination unit 103 is added to the transmission signal.

The modulation unit 105 modulates the data to be transmitted and obtain modulation data signal. In this modulation of the data, the transmission data are mapped onto a signal space having in-phase and orthogonal component based on a modulation method such as, for example, phase modulation such as BPSK (Binary Phase Shift Keying) or QPSK (Quadrature Phase Shift Keying), amplitude modulation such as PAM (Pulse Amplitude Modulation), QAM (Quadrature Amplitude Modulation). After the modulation the data signal is input into the characteristic data added signal generation unit 106. Herein, the data to be transmitted may be information data to be transmitted in practical communications or may be control data to be used for exchanging control information with the opposing radio stations and nearby radio stations.

The characteristic data added signal generation unit 106 converts the input modulation data into a signal in a predetermined radio signal format. In this case, the characteristic data added signal generation unit 106 converts the input modulation data into a signal corresponding to the additive characteristic data determined by the additive characteristic data determination unit 103 based on control signal from the characteristic data control unit 104. As examples of the radio signal format, there may be a signal format of an OFDMA (Orthogonal Frequency Division Multiple Access) method, a signal format of an SC-FDMA (Single-Carrier Frequency Division Multiple Access) method, a signal format of a CDMA (Code Division Multiple Access) method, or the like. However, the radio signal format is not limited to those signal formats, and any other appropriate signal format in any radio access technique may be used.

The signal to which the characteristic data has been added is input to the transmission/receiving separation unit 101, and transmitted to the opposing radio station to be communicated with via the antenna. As described above, in this functional block of FIG. 5, for simplification and explanatory purposes, units to be generally included in the radio transmission/receiving apparatus such as a frequency conversion unit, an amplifier, and a frequency limiting unit are omitted. Obviously, similar to a general radio transmission/receiving apparatus, it is assumed that such units are included in the radio transmission/receiving apparatus 10.

1.2 Characteristic Data

Next, detail of the characteristic data is described. As is described, as the characteristic data, statistical data exhibiting cyclostationarity, entropy of a signal, power variance and the like may be used. Those examples are similar to each other in that those examples commonly indicate the statistical properties of a signal. Therefore, the statistical data may be calculated by monitoring a signal for a certain period of time and performing some mathematical operations on the signal.

First, a statistical data indicating two-dimensional cyclostationarity is described. The two-dimensional cyclostationarity may be generally expressed by using statistical data called two-dimensional CAF (Cyclic Autocorrelation Function) or SCD (Spectral Correlation Density). Herein, the CAF (Cyclic Autocorrelation Function) of a signal x(t) is given in the following formula (1)

$$R_x^\alpha(\tau) = \lim_{T\to\infty} \frac{1}{T} \int_{-T/2}^{T/2} x\left(t+\frac{\tau}{2}\right) x^*\left(t-\frac{\tau}{2}\right) e^{-j2\pi\alpha t} dt \quad \text{formula (1)}$$

Further, in this case, the SCD (Spectral Correlation Density) is given in the following formula (2)

$$S_x^\alpha(f) = \int_{-\infty}^{\infty} R_x^\alpha(\tau) e^{-j2\pi f\tau} d\tau \quad \text{formula (2)}$$

$$= \lim_{T\to\infty} \frac{1}{T} X_T\left(f+\frac{\alpha}{2}\right) X_T^*\left(f-\frac{\alpha}{2}\right)$$

Where, symbols "$\alpha$" and "$\tau$" denote a cycle frequency and a lag parameter, respectively. Further, a function $X_T(f)$ is obtained by performing Fourier transformation on a time-domain signal x(t).

The characteristic data extraction unit 102 performs calculation described in formula (1) or (2) on the received signal x(t). More specifically, the characteristic data extraction unit 102 performs the CAF or SCD calculation based on predetermined "$\alpha$" and "$\tau$", and determines the calculated value of the CAF or SCD calculation as the value of the characteristic data $C_i$. In this case, the statistical data will have a peak value in the CAF or SCD calculation when specific "$\alpha$" and "$\tau$" are used depending on the modulation method and signal parameters. When "$\alpha$" and "$\tau$" are not equal to the specific "$\alpha$" and "$\tau$", respectively, the value of the characteristic data $C_i$ becomes zero or a value remarkably smaller than the peak value.

Next, the entropy of a signal is described. For example, it is assumed that, when a signal x(t) is sampled and quantized, and each of the quantized samples has a value equal to one of the $a_1, a_2, \ldots, a_M$; and the values of the probability of occurrence are given as $p(a_i)$ (i=1, 2, ..., M). In this case, the entropy of the signal is given in the following formula (3)

$$H = E[-\log_2 p(a_i)] \quad \text{formula (3)}$$

$$= -\sum_{i=1}^{M} p(a_i) \log_2 p(a_i)$$

Where symbol H denotes the entropy of the signal. The value of the entropy "H" of the signal approaches the maximum value one (1) when the values of the probability of occurrence are similar to each other; and the value of the entropy "H" of the signal becomes one (1) when all the values of the probability of occurrence are the same. On the other hand, the value of the entropy "H" of the signal approaches the minimum value zero (0) when the values of the probability of occurrence are concentrated around a certain value; and the value of the entropy "H" of the signal becomes zero (0) when all the values of the probability of occurrence are concentrated to a specific single value.

The characteristic data extraction unit 102 counts the number of occurrences of all the possible values of the samples after sampling and quantized to derive the probability of occurrences of the possible values of the samples, and performs the calculation according to formula (3). In this case, entropy "H" may be calculated using not the probability of occurrences of the possible values but the probability of occurrences of power level values of the samples. For example, in a case where the entropy "H" is calculated using the power level value, if the transmission signal is the OFDMA-based signal, the amplitude values vary in an extremely wide range; therefore, the entropy "H" becomes larger. On the other hand, if the transmission signal is the CDMA-based signal, the amplitude is relatively constant; therefore, the entropy "H" becomes smaller. As described above, the characteristic of the signal waveform may be expressed based on the entropy. Further, it may become possible to generate a signal having a prescribed entropy value by generating the signal so that the values after being sampled and quantized are concentrated or distributed.

Further, the power variance of the signal x(t) is given in the following formula (4)

$$V = E[(|x(t)|^2 - E[|x(t)|^2])^2] \quad \text{formula (4)}$$

Where, symbol "V" denotes the power variance. The power valiance "V" is the variance of the power indicating the variance (difference) between the observed instantaneous power value and the average power value. As is described, when the transmission signal is the OFDMA-based signal, the amplitude variance values are large; therefore, the power valiance "V" becomes larger. On the other hand, the amplitude variance values in the CDMA method is small; therefore, the power valiance "V" becomes also small.

The CAF (Cyclic Autocorrelation Function) and SCD (Spectral Correlation Density) may be preferably used as the characteristic data because the characteristic of the signal waveform may be derived even when the received signal level is so low as to be buried under noise level. Further, the CAF and SCD may also be preferably used as the characteristic data in a case where the use frequency band of the data modulation method in the system is shared with other system because information of the characteristic data may be exchanged between the systems without decoding. Further, the statistical data exhibiting cyclostationarity, entropy of a signal, power variance are described as examples only. Therefore, any other appropriate statistical data may be alternatively used.

1.3 Operations

Operations of the radio transmission/receiving apparatus 10 according to the first embodiment of the present invention are described.

Figure 8:
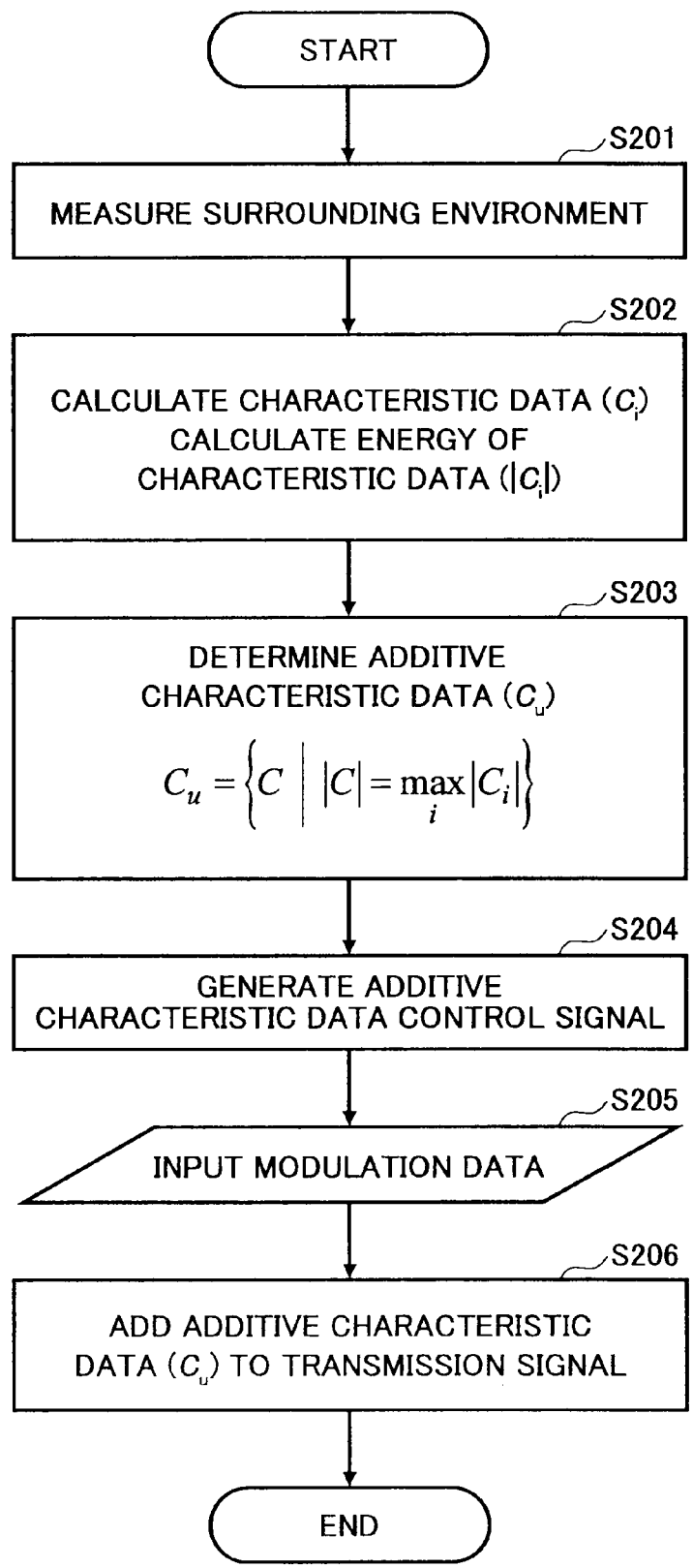
FIG. 8 is a flowchart showing a process of radio transmission/receiving operations according to the first embodiment of the present invention.

FIG. 8 is a flowchart showing exemplary operations of the radio transmission/receiving apparatus 10.

As shown in FIG. 8, first, the radio transmission/receiving apparatus 10 measures surrounding environment (step S201). Specifically, the radio transmission/receiving apparatus 10 receives a signal via the antenna, the signal being transmitted from a nearby radio stations and acquires the signal.

The characteristic data extraction unit 102 calculates predetermined characteristic data ($C_i$:i=1,2, ... ) of the received signal, and further calculates the energy of the characteristic data ($|C_i|$) in the received signal (step S202).

The additive characteristic data determination unit 103 determines the additive characteristic data ($C_u$) from among the calculated characteristic data (step S203). In the case of FIG. 8, the characteristic data having the highest energy is selected as the additive characteristic data ($C_u$) from among the calculated characteristic data $C_1, C_2, \ldots$.

The characteristic data control unit 104 generates a control signal to control the characteristic data added signal generation unit 106 based on the determined additive characteristic data ($C_u$) (step S204).

The characteristic data added signal generation unit 106 takes in (receives) modulation data signal generated by the modulation unit 105, and generates a radio signal by adding the additive characteristic data to the modulation data signal based on the control signal input from the characteristic data control unit 104 (step S206). As described above, the characteristic data may be expressed by various data. For example, by appropriately setting the cycle frequency "α" and the lag parameter "τ", the characteristic data exhibiting cyclostationarity may be added to the transmission signal. Further, by appropriately setting the probability of occurrence of the possible values of the data sequence of the modulation data (or the power level values of the modulation data), the characteristic data expressed by using the entropy and the power variance may be set to a desirable value.

1.4 Effect

An effect of the first embodiment of the present invention is described. According to the first embodiment of the present invention, by executing the operational flow of FIG. 8 by the radio stations, the radio stations having the same additive characteristic data may be geographically unevenly (locally) distributed within a target area. As a result, geographical information may be associated with the information of the characteristic data.

Figure 9:
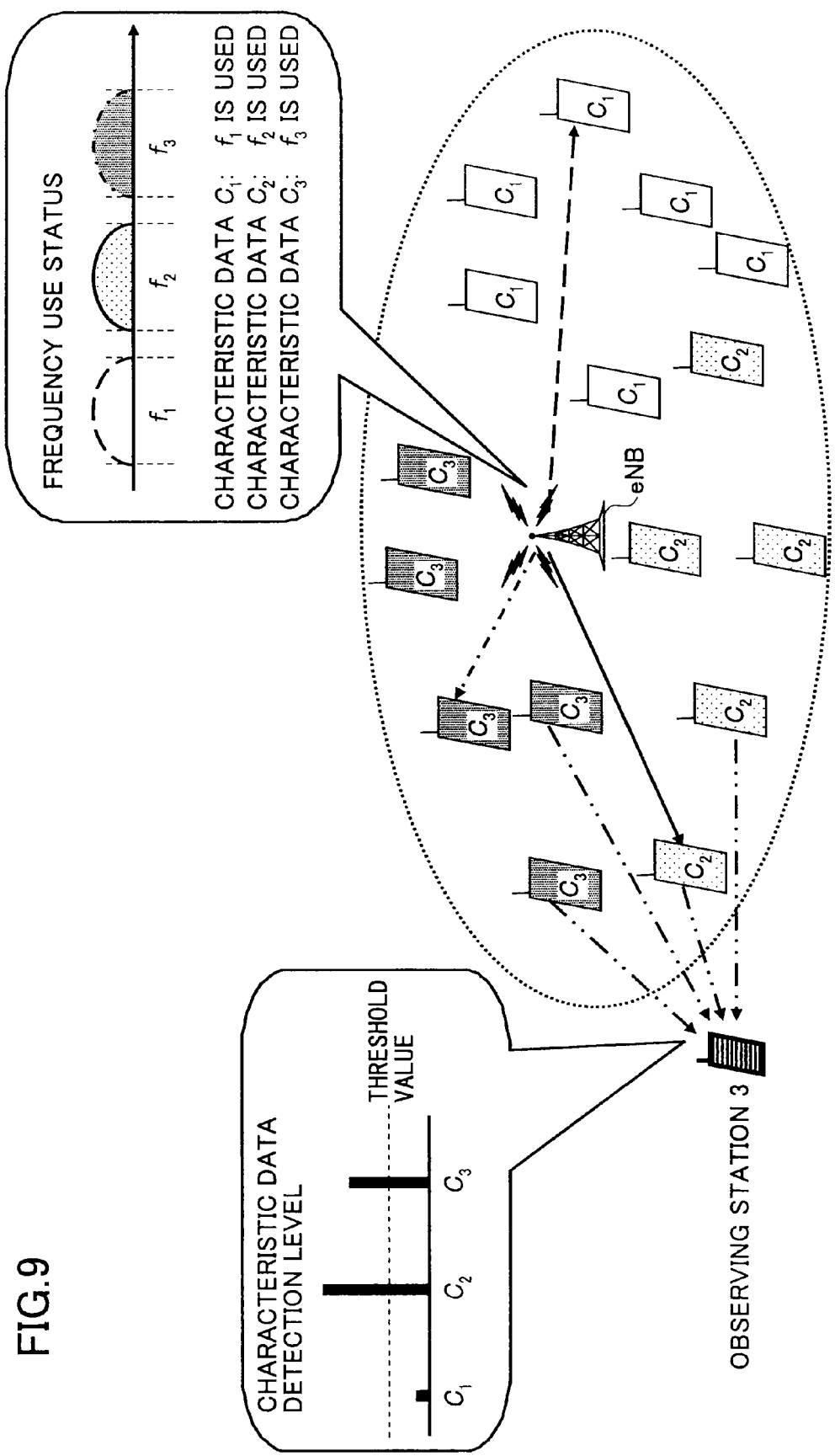
FIG. 9 is a conceptual drawing showing an effect of the radio transmission/receiving operations according to the first embodiment of the present invention.

FIG. 9 schematically shows a status achieved after the process in the flowchart of FIG. 8 is performed. Further, FIG. 9 corresponds to the right side of FIG. 7. By performing the operations described with reference to FIG. 8 is performed by the radio stations, a status may be achieved where the radio stations having the same additive characteristic data are geographically unevenly (locally) distributed. Then, it is assumed that an observing station 3 is now present and is desired to start communication via the base station 1g. Next, the observing station 3 receives signals from nearby radio stations, analyses the received signals, and calculates the respective characteristic data. In this case, the additive characteristic data $C_2$ and $C_3$ of the radio stations located relatively closer to the observing station 3 are detected at a level greater than a predetermined threshold value. On the other hand, the additive characteristic data $C_1$ of the radio stations located relatively far from the observing station 3 is detected at a level less than the predetermined threshold value. Due to the feature that the radio stations using the same additive characteristic data are geographically unevenly (locally) distributed, the observing station 3 may estimate that the radio stations having the additive characteristic data $C_1$ are located only in an area far from the observing station 3. Therefore, the observing station 3 may reuse the frequency allocated (corresponding) to the additive characteristic data $C_1$.

Further, in this case, it is assumed that the observing station 3 has been received frequency usage information from the base station 1g or the like wirelessly or by a cable, the frequency usage information including the information of the use frequency bands ($f_1$, $f_2$, and $f_3$) and the information of the characteristic data added to (used in) the radio stations using the use frequency bands ($f_1$, $f_2$, and $f_3$) (i.e., the frequency $f_i$ corresponds to the characteristic data $C_i$). Further, the frequency usage information may be stored in a server on a network accessible from the radio station performing a process of the characteristic data.

In the example of FIG. 9, the observing station 3 may be able to know that the detection level of the characteristic data $C_1$ is less than the predetermined threshold level based on the analysis result. Further, the observing station 3 knows that, based on the frequency usage information, any of the base stations using the characteristic data $C_1$ uses the use frequency band $f_1$. Therefore, the observing station 3 may be able to determine that the risk that the use of the frequency band $f_1$ by the observing station 3 interferes the communications of the nearby radio stations is very small. As a result, the observing station 3 may determine to use the frequency band $f_1$ by selecting the characteristic data $C_1$. By acting in this way, the observing station 3 may ensure the opportunity of the communications while better controlling the interference with the nearby communications.

1.5 Modification

A modification of the first embodiment of the present invention is described.

Figure 10:
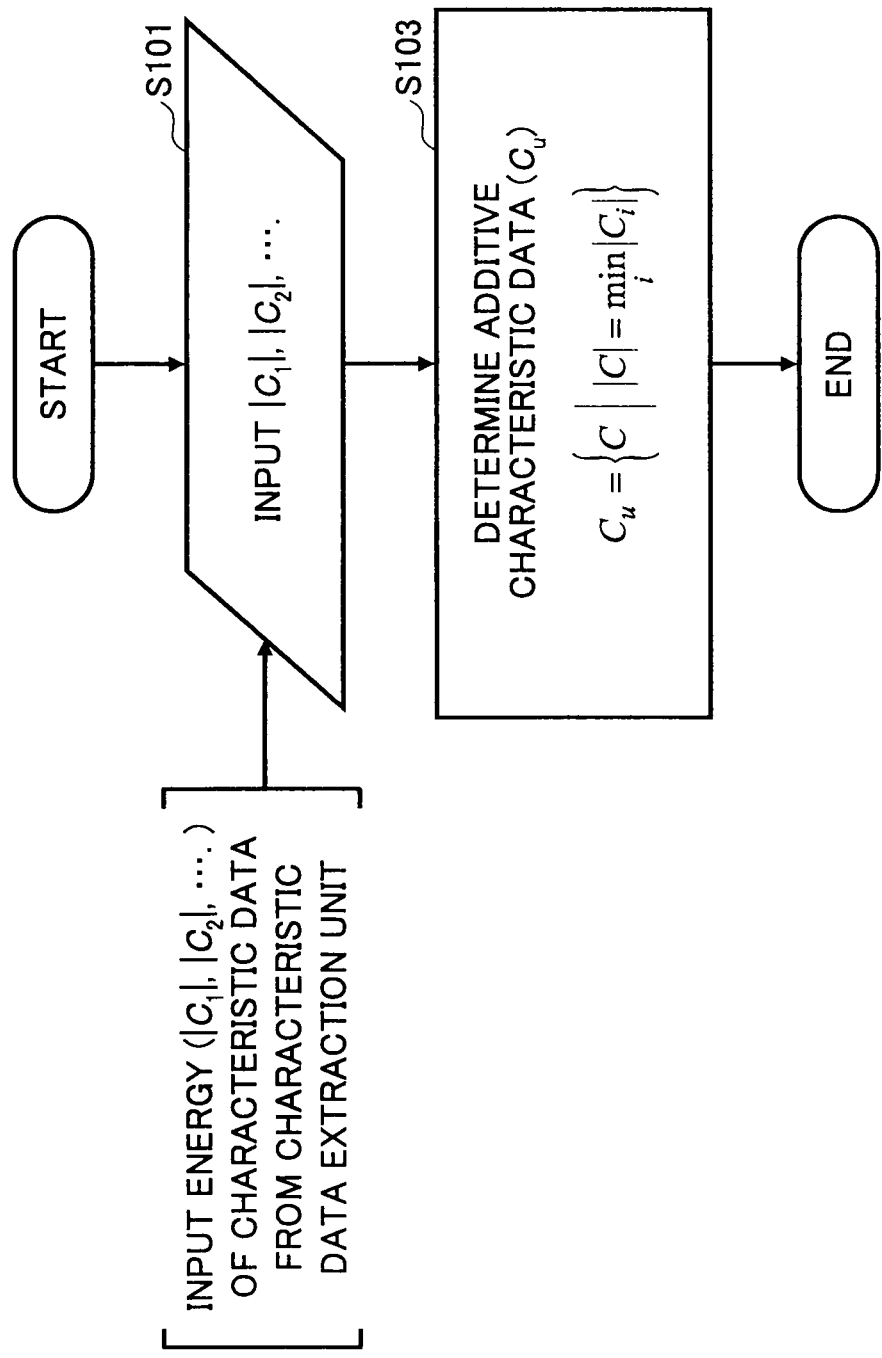
FIG. 10 is a flowchart showing a process of determining the additive characteristic data according to a modification of the first embodiment of the present invention.

FIG. 10 is a flowchart showing a process of determining the additive characteristic data according to the modification of the first embodiment of the present invention. The process of FIG. 10 is similar to that of FIG. 6; however, the criteria used in determining the additive characteristic data ($C_u$) are different from each other.

As shown in the flowchart of FIG. 10, the energy (energy value) of plural characteristic data ($|C_1|, |C_2|, \ldots$) detected by the characteristic data extraction unit 102 are input to the additive characteristic data determination unit 103 (step S101).

In this modification, the additive characteristic data determination unit 103 determines (selects) the characteristic data having the lowest energy value as the additive characteristic data (step S103).

As described in the flowchart of FIG. 6, the closer the radio station is located to the radio transmission/receiving apparatus 10, the higher energy is more likely to be received from radio station by the radio transmission/receiving apparatus 10. Because of this feature, when the characteristic data having the lowest energy value is selected as the additive characteristic data, by a radio station. The radio station is more likely to select the additive characteristic data different from that used in the nearby radio stations.

Figure 11:
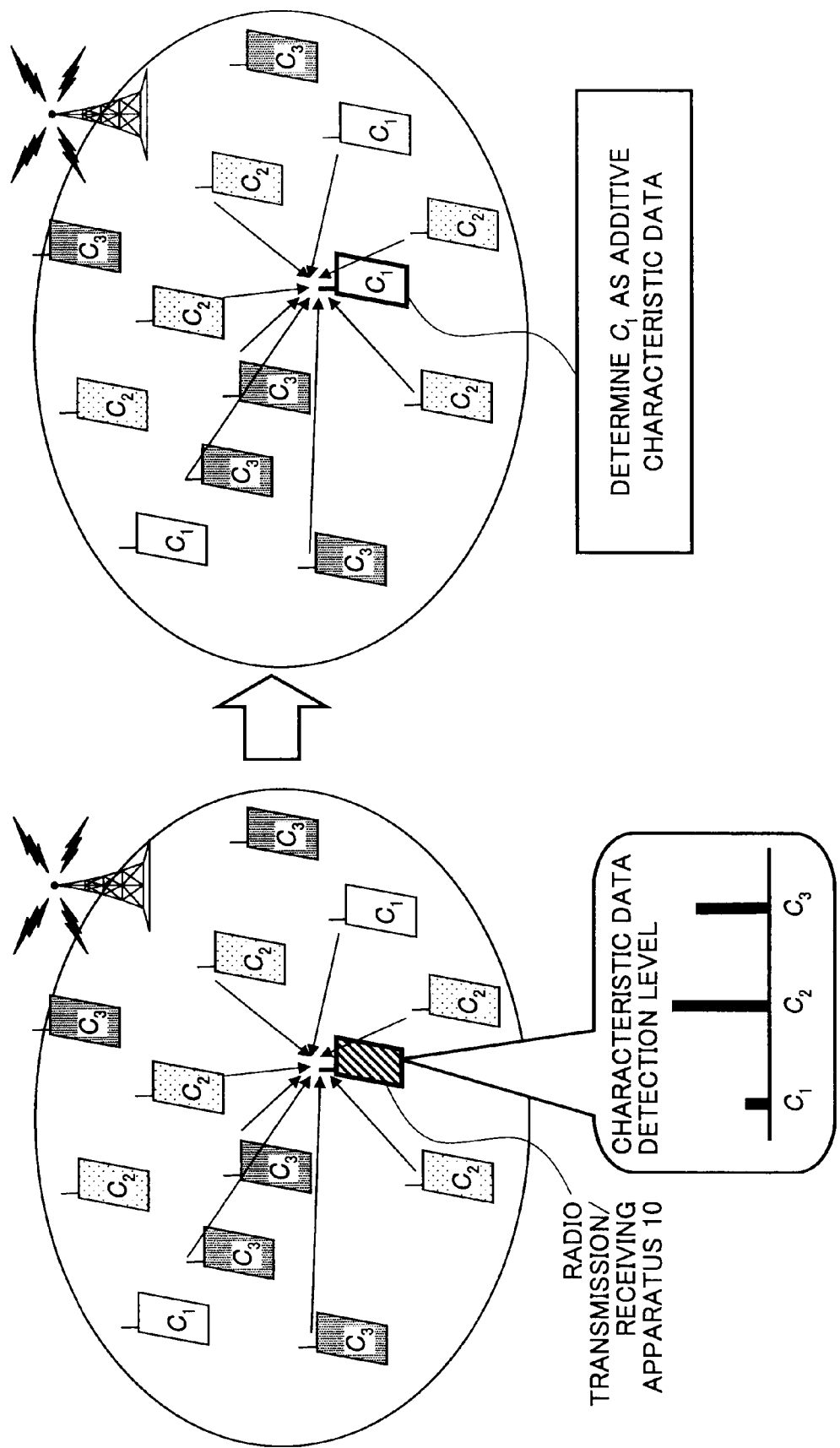
FIG. 11 is a drawing showing a concept and an effect of determining an additive characteristic data according to a modification of the first embodiment of the present invention.

FIG. 11 schematically shows a concept and an effect of determining the additive characteristic data according to this modification of the first embodiment of the present invention. It is assumed that the radio transmission/receiving apparatus 10 with hatched lines shown in the left side of FIG. 11 receives signals from nearby radio stations and obtains the measurement (calculation) values of the characteristic data $C_1, C_2$, and $C_3$ as shown in FIG. 11. According to the process of the flowchart of FIG. 10, the characteristic data $C_1$ having the lowest energy is selected as the additive characteristic data from among the characteristic data $C_1, C_2$, and $C_3$. As a result of this determination, a use status of the characteristic data as described in the right side of FIG. 11 is formed. When the characteristic data $C_1$ having the lowest energy is selected as the additive characteristic data according to the flowchart of FIG. 10, the radio stations (terminals) using the same additive characteristic data may be disposed at geographically dispersed locations within a target area. From this viewpoint, the effect opposite to that obtained in the case shown in FIGS. 7 and 9 may be obtained.

Figure 4:
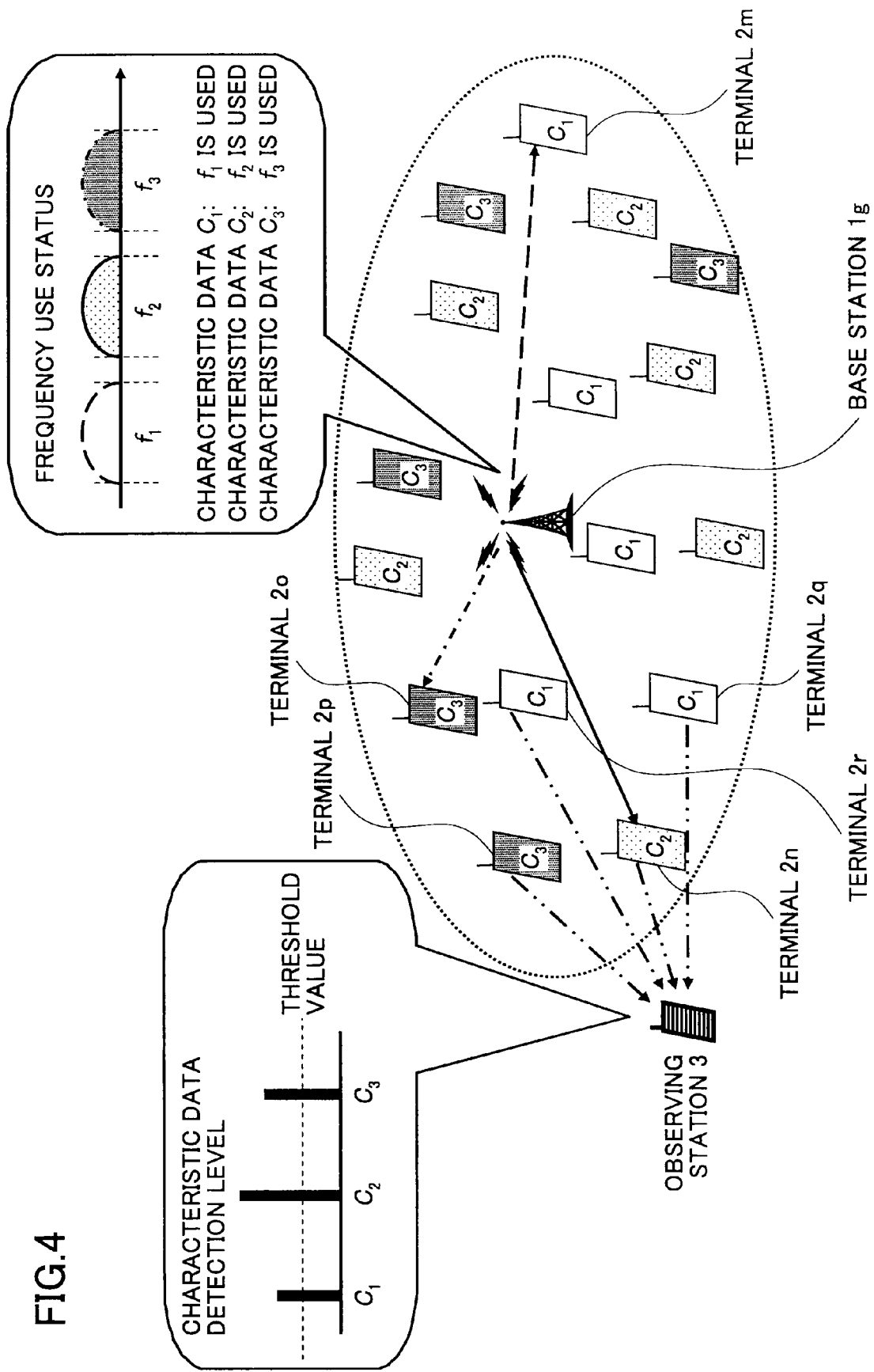
FIG. 4 is a conceptual drawing in which an interference control is performed when radio stations are randomly using characteristic data of signal waveforms.

From the viewpoints of enhancing the frequency use efficiency, it may not be preferable when the characteristic data used in the radio stations are geographically dispersedly distributed as shown in the right side of FIG. 11, as described with reference to FIG. 4. However, there may be a case where it is rather advantageous to intentionally achieve (form) the status as shown in the right side of FIG. 11. For example, in the status of the right side of FIG. 11, the probability that the power level values of all the characteristic data are detected at non-negligible levels in various locations within the target area is increased. Therefore, when a user (i.e., radio station) intents to start communication with in the target area may not easily obtain the opportunity to start communication. This is obviously not advantageous to such new user (radio station). However, for example, when a high-priority communication has been conducted in the area shown in the right side of FIG. 11, the above method may be preferable from the viewpoint of controlling the interference with the high-priority communication.

Figure 12:
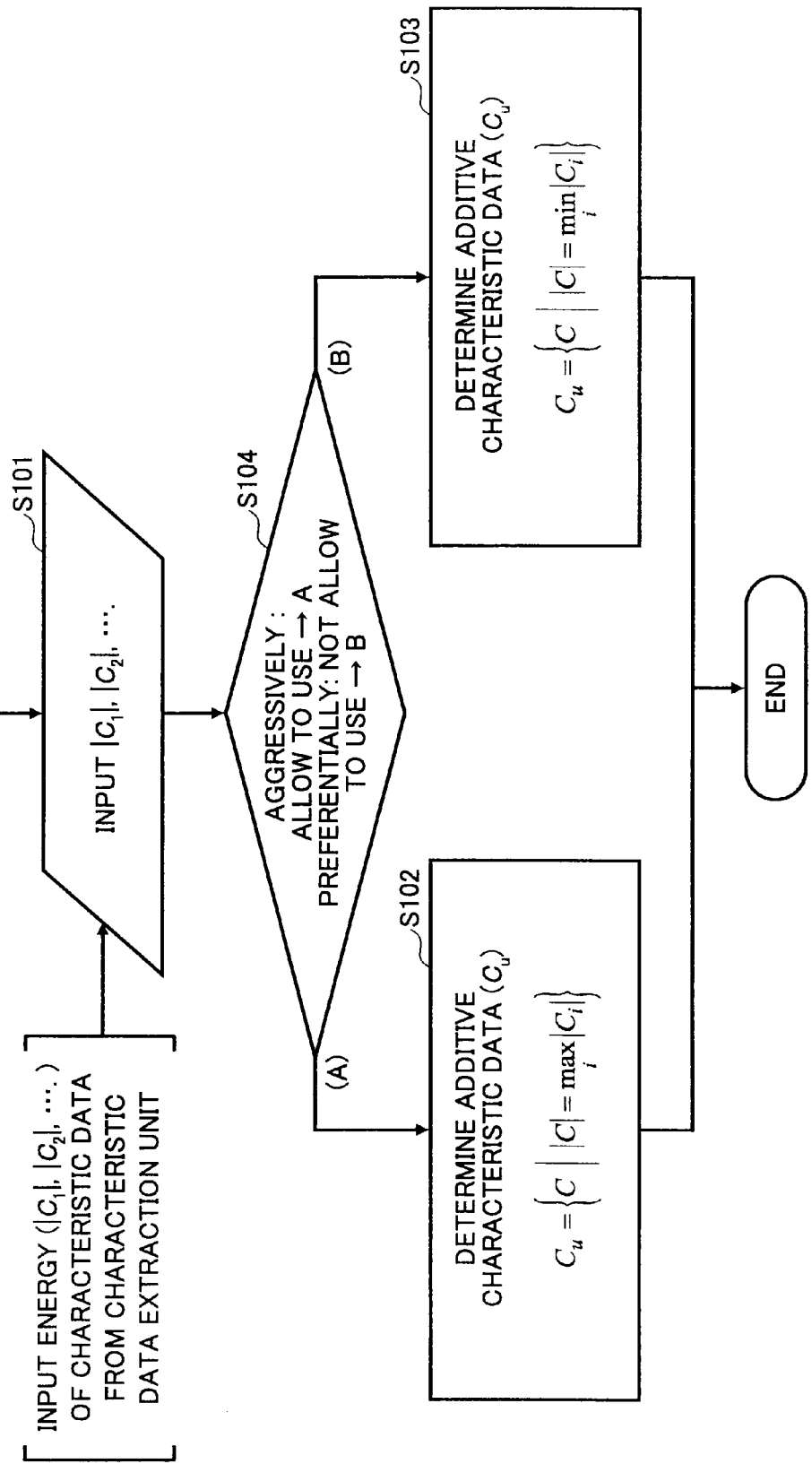
FIG. 12 is a drawing showing combined operations of determining the additive characteristic data according to the first embodiment and the modification of the first embodiment of the present invention.

This method of this modification may be used with the method of FIG. 6. In this case, as shown in FIG. 12, in some cases, the additive characteristic data ($C_u$) may be determined so as to maximize the frequency use efficiency by allowing aggressive use of nearby radio stations. In other cases, the additive characteristic data ($C_u$) may be determined so as to ensure the quality of the high-priority communication by controlling (not allowing) the start of communications by the nearby radio stations. In step S104, it is determined which status is to be achieved. Then, based on the determination result in step S104, the process goes to either step S102 or step S103. By having this feature, it may become possible to control the interference in accordance with the communication status changing every second.

2. Second Embodiment 2.1 System

In the following, a radio communication system according to a second embodiment of the present invention is described.

The radio communication system according to the second embodiment of the present invention includes plural radio stations and the opposing radio stations.

Figure 13:
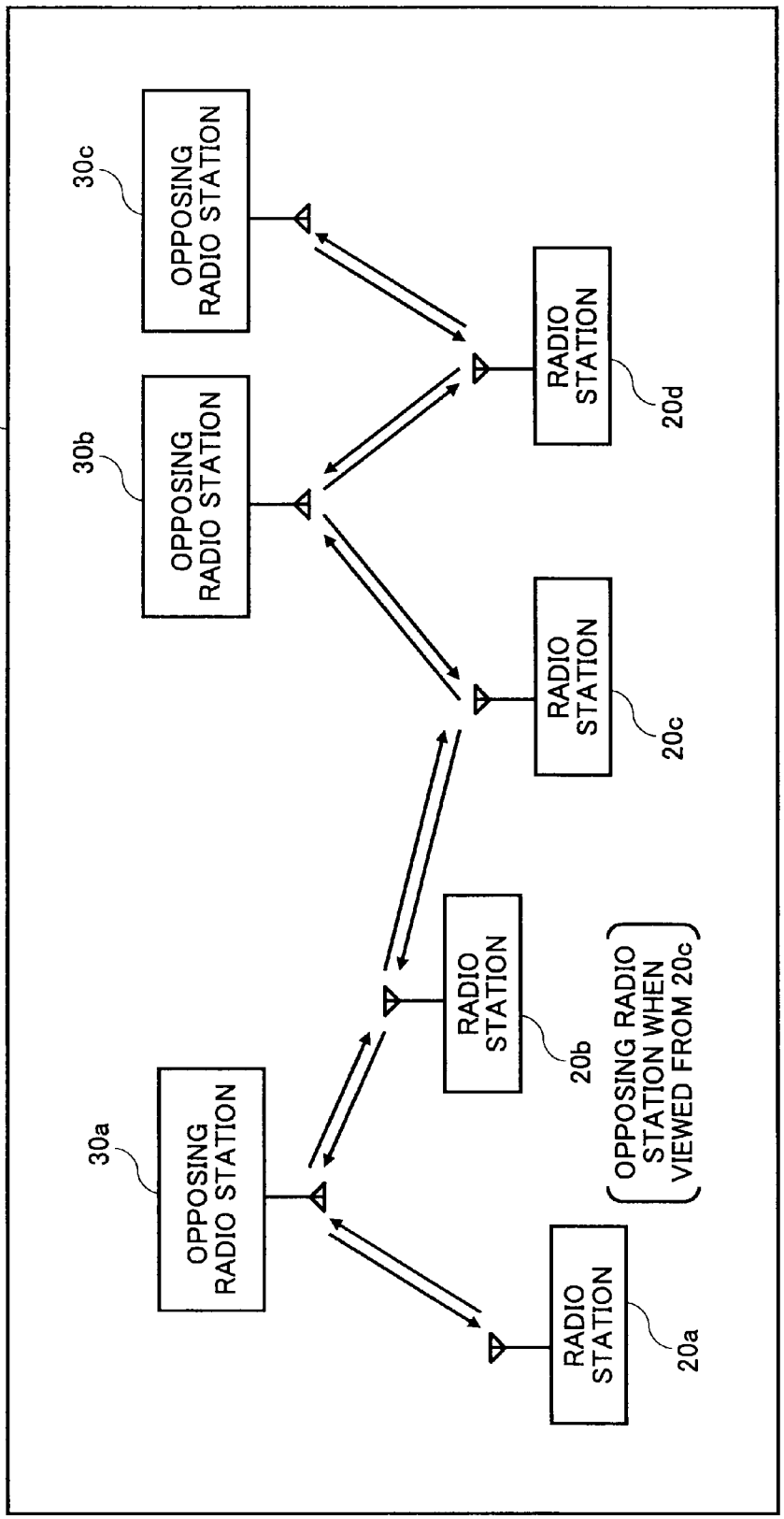
FIG. 13 is a conceptual drawing showing a radio communication system according to a second embodiment of the present invention.

FIG. 13 schematically and conceptually illustrates a radio communication system 1000 according to the second embodiment of the present invention. In the radio communication system 1000, radio station(s) 20 are communicating with opposing radio station(s) 30. In the following, the radio station 20 and the opposing radio station 30 of the radio communication system 1000 are described. In the following, the functions of the radio station 20 and those of the opposing radio station 30 are separately described. However, the present invention is not limited to the configuration. For example, the radio station 20 may further include any or all of the functions of the opposing radio station 30. Similarly, the opposing radio station 30 may further include any or all of functions of the radio station 20. For example, in the example of FIG. 13, the radio station 20b is communicating with the opposing radio station 30a and also communicating with the radio station 20c. In this case, either the radio station 20b or the radio station 20c may have the functions of the opposing radio station 30. Otherwise, both of the radio station 20b and the radio station 20c may have the functions of the opposing radio station 30. The radio station may be user equipment or a base station. Similarly, the opposing radio station may be the user equipment or the base station. In a preferred example, the radio station is the user equipment, and the opposing radio station is the base station.

2.2 Configurations of Radio Station and Opposing Radio Station

Figure 14:
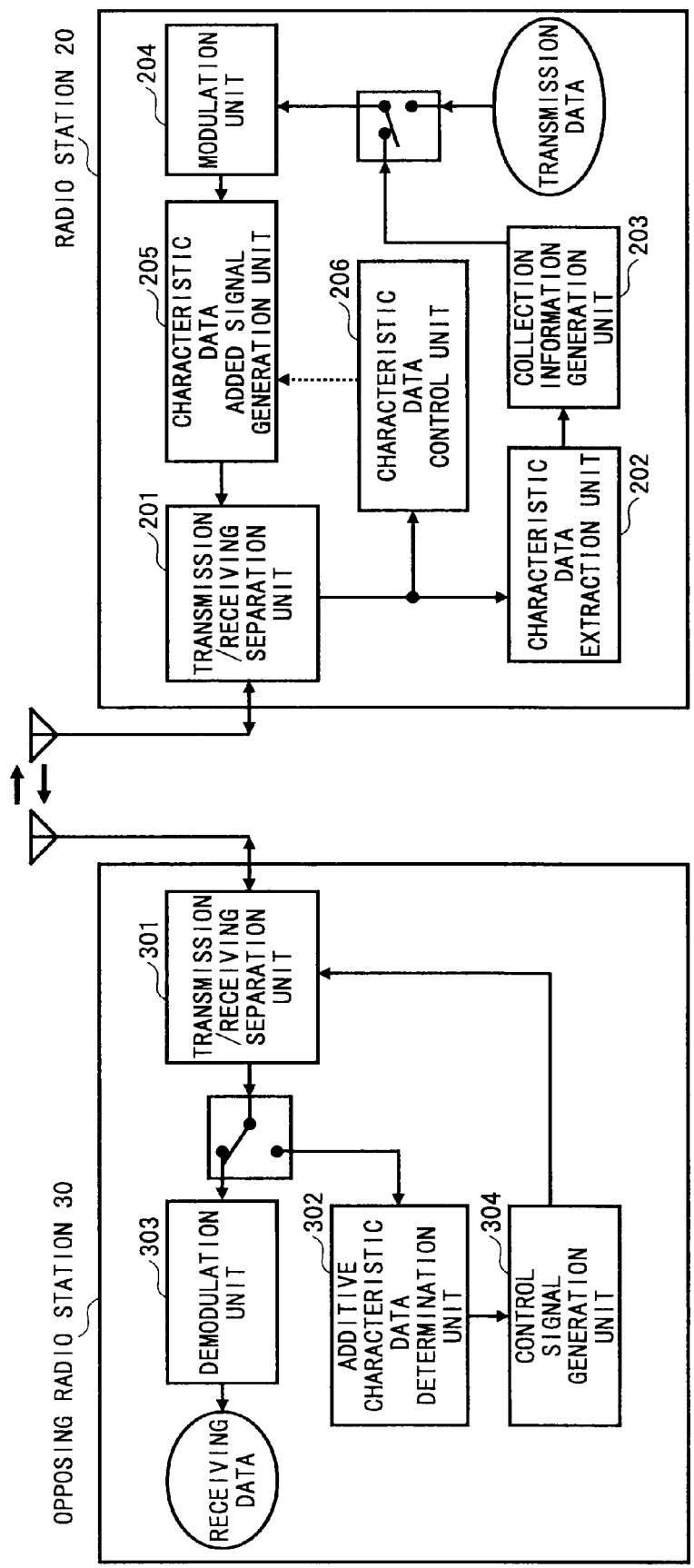
FIG. 14 is a block diagram showing exemplary functional configurations of a radio station and an opposing radio station in a radio communication system according to the second embodiment of the present invention.

FIG. 14 is a block diagram showing exemplary functional configurations of the radio station 20 and the opposing radio station 30 communicating with the radio station 20. As shown in FIG. 14, the radio station 20 includes a transmission/receiving separation unit 201, a characteristic data extraction unit 202, a collection information generation unit 203, a modulation unit 204, a characteristic data added signal generation unit 205, and a characteristic data control unit 206. On the other hand, the opposing radio station 30 includes a transmission/receiving separation unit 301, an additive characteristic data determination unit 302, a demodulation unit 303, and a control signal generation unit 304.

In the following, those elements of the radio station 20 and the opposing radio station 30 are described with reference to FIG. 5.

First, the radio station 20 is described.

The transmission/receiving unit separation 201 of the radio station 20 receives signals from outside via an antenna, and transfers the signal to the characteristic data extraction unit 202. For example, in the example of FIG. 13, the "signals from outside" of the radio station 20a refer to signals transmitted from the radio stations 20b, 20c, and 20d and the opposing radio stations 30b and 30c. However, the signal from the opposing radio station 30a may be included in the "signals from outside", so that the signals form outside including the signal from the opposing radio station 30a may be transferred to the characteristic data extraction unit 202. Especially, three may be a case where, when the communication with the opposing radio station has not been established or when plural signals are transmitted in the same frequency band, all the signals are received without being separated from each other and transmitted to the characteristic data extraction unit 202. In this functional block of FIG. 14, for simplification and explanatory purposes, units to be generally included in the radio transmission/receiving apparatus such as a frequency conversion unit, an amplifier, and a frequency limiting unit are omitted. Obviously, similar to a general radio station, it is assumed that such units are included in the radio station 20.

The characteristic data extraction unit 202 extracts and calculates characteristic data of the received signal transferred from the transmission/receiving separation unit 201. The characteristic data extraction unit 202 calculates a predetermined type of characteristic data extraction and calculates the energy of the characteristic data. It is assumed that the demodulation of the modulation data signal included in the received signal is not performed at this stage. The characteristic data is already described above.

The collection information generation unit 203 generates collection information of the characteristic data to be reported to the transmitted to the opposing radio station 30, the characteristic data having been extracted from the received signal by the characteristic data extraction unit 202. In this case, data such as the characteristic data detection level as shown in the left side of FIGS. 7, 9, and 11 are reported. To report such data, a bit sequence data or a symbol sequence data indicating the characteristic data detection level are provided (generated) by the collection information generation unit 203 as output data. In this case, if preferable, the characteristic data detection level may be normalized or quantized when the bit sequence data or the symbol sequence data are generated.

The modulation unit 204 module either the generated collection information or the communication data to be transmitted after the communication is established, or both to generate a modulation data signal as output data.

The characteristic data added signal generation unit 205 converts the input modulation data signal into a signal having a predetermined radio signal format. Further, characteristic data added signal generation unit 205 adds the characteristic data to the signal based on a control signal from the characteristic data control unit 206.

The characteristic data control unit 206 controls the characteristic data added signal generation unit 205 in a manner such that the additive characteristic data can be added to the signal (transmission signal), the additive characteristic data having been determined by the additive characteristic data determination unit 302 (described below) of the opposing radio station 30. However, as described in detail below, when the collection information is transmitted from the radio station 20 to the opposing radio station 30, the additive characteristic data to be added to the transmission signal may not have been determined by the opposing radio station 30. In such a case, no additive characteristic data may be added to the transmission signal, or a dedicated additive characteristic data indicating the transmission of the collection information may be determined in advance in the radio communication system and transmitted to the opposing radio station 30 and the opposing radio station 30 may have a function to detect the dedicated additive characteristic data in the transmission signal, so that the opposing radio station 30 may detect the dedicated additive characteristic data to recognize that the collection information is included in the transmission signal.

The signal with added additive characteristic data is input to the transmission/receiving separation unit 201 and transmitted to other radio station communicating with the radio station 20 via an antenna. In this functional block of FIG. 14, for simplification and explanatory purposes, units to be generally included in the radio transmission/receiving apparatus such as a frequency conversion unit, an amplifier, and a frequency limiting unit are omitted. Obviously, similar to a general radio station, it is assumed that such units are included in the radio station 20.

Next, the opposing radio station 30 is described.

The transmission/receiving separation unit 301 of the opposing radio station 30 transfers the received collection information to the additive characteristic data determination unit 302 and transfers the communication data after the communication is established to the demodulation unit 303. FIG. 14 shows an example where the received signal are transferred to the additive characteristic data determination unit 302 or the demodulation unit 303 depending on whether the received signal is the collection information or the communication data, respectively.

However, this configuration is not essential to the present invention. For example, the received signal may be input to both the additive characteristic data determination unit 302 and the demodulation unit 303 so that each unit may determine whether the received signal is the collection information or the communication data. Further, for example, the characteristic data added signal generation unit 205 of the radio station 20 may add a dedicated characteristic data indicating that the transmission signal includes the collection information or the communication data, so that the opposing radio station 30 calculates (detects) the dedicated characteristic data and the switch disposed downstream side of the transmission/receiving separation unit 301 may select the appropriate destination of the received signal. In this functional block of FIG. 14, for simplification and explanatory purposes, units to be generally included in the radio transmission/receiving apparatus such as a frequency conversion unit, an amplifier, and a frequency limiting unit are omitted. Obviously, similar to a general radio station, it is assumed that such units are included in the opposing radio station 30.

The additive characteristic data determination unit 302 determines the additive characteristic data of (to be used by) the radio station 20 using the received collection information in accordance with a predetermined interference control policy. For example, similar to the first embodiment described above, by using the collection information, the additive characteristic data determination unit 302 calculates the energy of the characteristic data ($|C_i|$) at the radio station 20, and determines the additive characteristic data according to any of the methods shown in FIGS. 6, 10, and 12. As a result, the characteristic data having highest or lowest energy at the radio station 20 from among all the detected characteristic data is determined (selected) as the additive characteristic data of the radio station 20. The demodulation unit 303 demodulates the communication data. By obtaining the received data, after the communication is established, the information transmitted by the radio station 20 can be obtained. The control signal generation unit 304 generates an additive characteristic data control signal so that the characteristic data control unit 206 controls the characteristic data added signal generation unit 205 in a manner such that the additive characteristic data can be added to the signal (transmission signal), the additive characteristic data having been determined by the additive characteristic data determination unit 302 of the opposing radio station 30.

In this case, the additive characteristic data control signal is transmitted to the base station apparatus 20 via the transmission/receiving separation unit 301. In this functional block of FIG. 14, for simplification and explanatory purposes, units to be generally included in the radio transmission/receiving apparatus such as a frequency conversion unit, an amplifier, and a frequency limiting unit are omitted. Obviously, similar to a general radio station, it is assumed that such units are included in the opposing radio station 30.

2.3 Operations

Operations of the radio communication system 1000 according to the second embodiment of the present invention are described.

Figure 15:
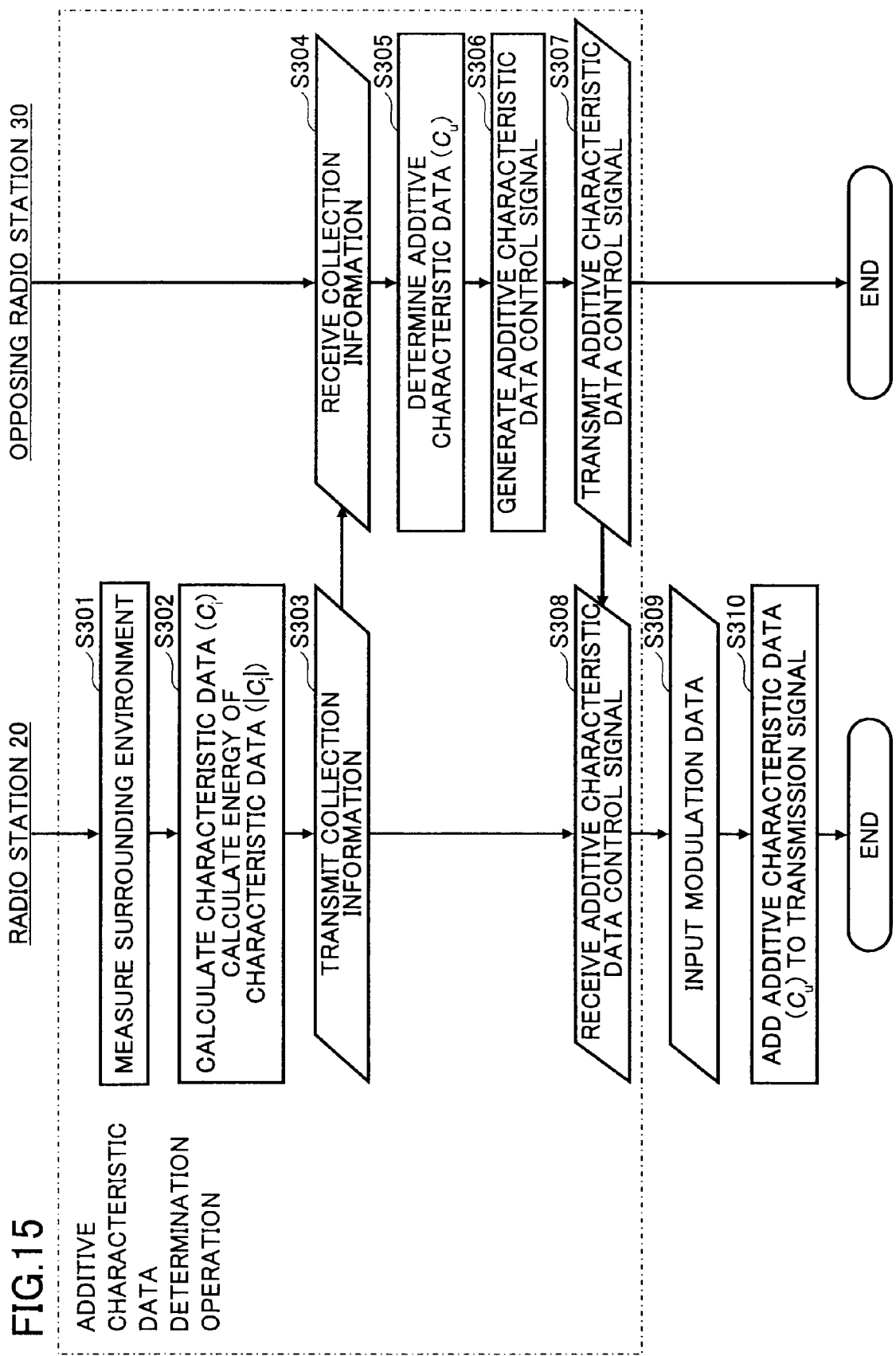
FIG. 15 is a flowchart showing a process of determining the additive characteristic data according to the second embodiment of the present invention.

FIG. 15 is a flowchart showing exemplary operations (hereinafter referred to as "additive characteristic data determination operation") of determining the additive characteristic data of (to be used by) the radio station 20, the operations being performed by both the radio station 20 and the opposing radio station 30.

As shown in FIG. 15, first, the radio station 20 measures surrounding environment by receiving signals transmitted from nearby radio stations via an antenna (step S301).

The characteristic data extraction unit 202 calculates predetermined characteristic data ($C_i$:i=1,2, . . . ) of the received signal, and further calculates the energy of the characteristic data ($|C_i|$) in the received signal (step S302).

Based on the calculation result, the collection information generation unit 203 generates the collection information. The collection information is modulated by the modulation unit 204. Then, the collection information is converted into a signal in a radio signal format by the characteristic data added signal generation unit 205. In this case, the characteristic data added signal generation unit 205 may add the characteristic data to the signal in the radio signal format. Then the signal including the collection information (collection information signal) is transmitted to the opposing radio station 30 (step S303).

However, in step S303, the additive characteristic data of (to be used by) the radio station 20 may not determined. In this case, the characteristic data added signal generation unit 205 may not add any characteristic data to the signal. Because of this feature, this operation (description) is omitted in FIG. 15.

Upon receiving the signal including the collection information (collection information signal) from the radio station 20 (step S304), the additive characteristic data determination unit 302 of the opposing radio station 30 determines the additive characteristic data ($C_u$) (step S305). In this case, similar to the first embodiment of the present invention, as the method of determining the additive characteristic data ($C_u$), any of the methods shown in FIGS. 6, 10, and 12 may be used.

The control signal generation unit 304 generates the additive characteristic data control signal so that the characteristic data control unit 206 controls the characteristic data added signal generation unit 205 in a manner such that the additive characteristic data can be added to the signal (transmission signal), the additive characteristic data having been determined by the additive characteristic data determination unit 302 of the opposing radio station 30 (step S306).

Then, the additive characteristic data control signal is transmitted to the radio station 20 via the transmission/receiving separation unit 301 (steps S307 and S308).

Based on the received additive characteristic data control from the opposing radio station 30, the characteristic data added signal generation unit 205 of the radio station 20 inputs the modulation data signal and adds the additive characteristic data to the modulation data signal, the additive characteristic data having been determined by the additive characteristic data determination unit 302 of the opposing radio station 30 in step S306.

2.4 Effect

An effect of the second embodiment of the present invention is described. According to the second embodiment of the present invention, the functions to perform the above additive characteristic data determination operation is separated in two stations (i.e., the radio station 20 and the opposing radio station 30). By separating the functions in this way, the radio stations using the same characteristic data may be geographically unevenly (locally) distributed or geographically dispersedly distributed. As a result, it may become possible to perform highly-accurate environment-recognition type interference control. Further, the functions to perform the additive characteristic data determination operation is separated between the radio station 20 and the opposing radio station 30, it may become possible to reduce the functions in both the radio station 20 and the opposing radio station 30; thereby enabling performing the interference control while simplifying the configurations and reducing the size.

2.5 Modifications

Next, modifications of the second embodiment of the present invention are described.

2.5.1 First Modification

Figure 16:
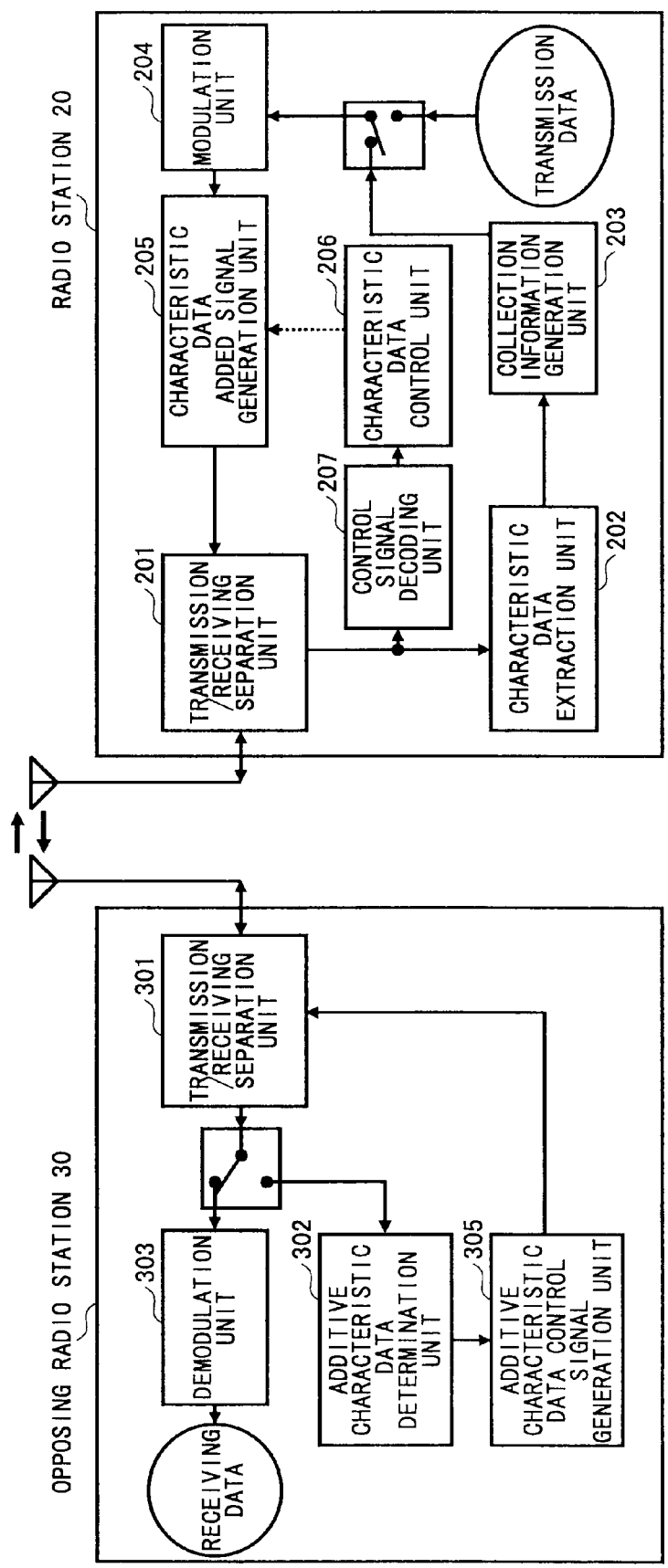
FIG. 16 is a block diagram showing an exemplary functional configuration of the radio station and the opposing radio station of a radio communication system according to a first modification of the second embodiment of the present invention.

FIG. 16 is a block diagram showing an exemplary functional configuration of the radio station and the opposing radio station of a radio communication system according to a first modification of the second embodiment of the present invention. As shown in FIG. 16, the configuration in the first modification differs from that in the second embodiment in that there is provided an additive characteristic data report signal generation unit 305 instead of the control signal generation unit 304 in the radio station 20 and there is additionally provided a repot signal decoding unit 207 in the radio station 20. The report signal generated by the additive characteristic data report signal generation unit 305 is decoded by the repot signal decoding unit 207. The decoding result is used when the characteristic data control unit 206 generates the control signal.

Figure 17:
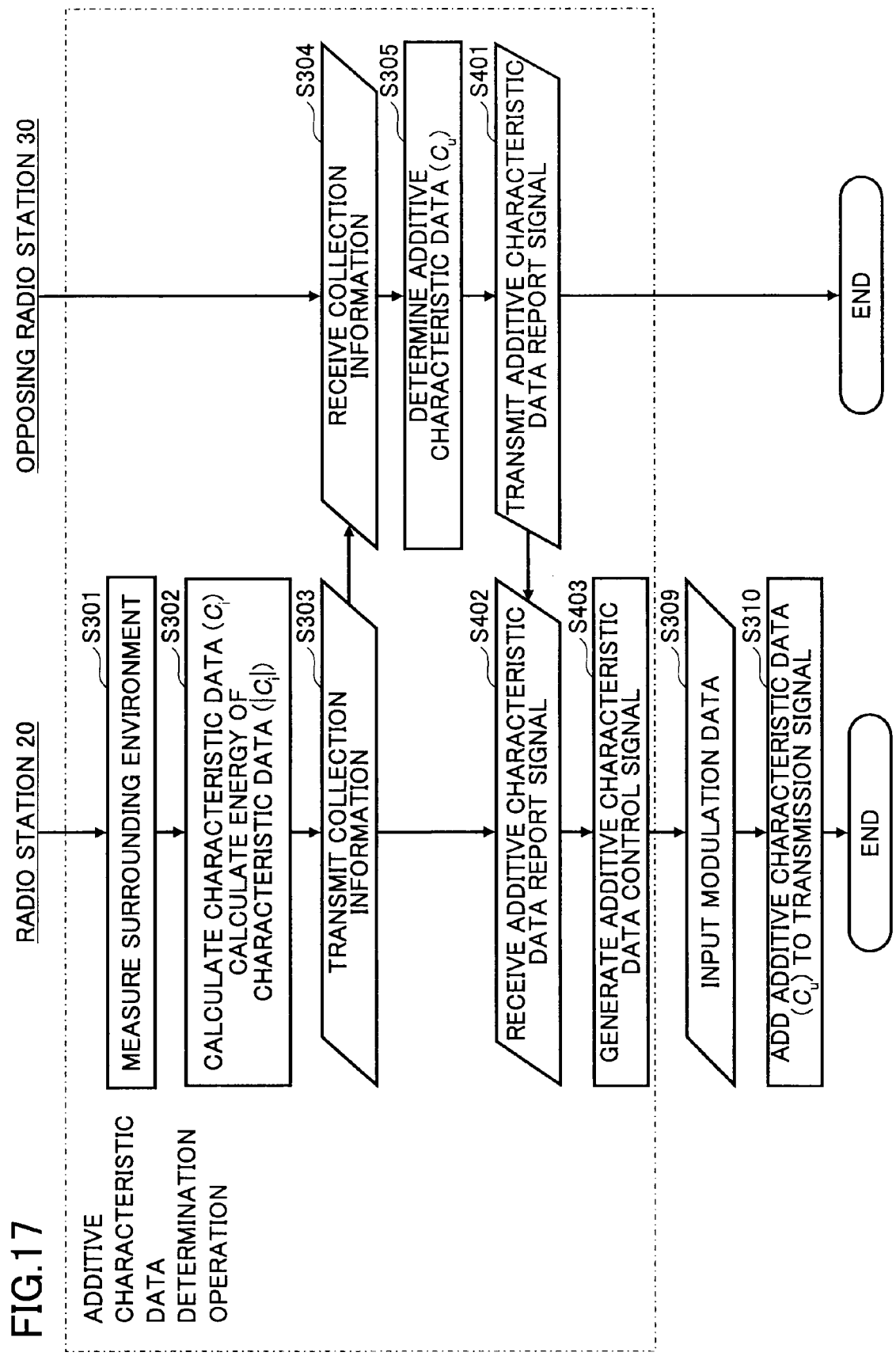
FIG. 17 is a flowchart showing a process of determining the additive characteristic data according to the first modification of the second embodiment of the present invention.

FIG. 17 is a flowchart showing the additive characteristic data determination operation according to the first modification of the second embodiment of the present invention. Generally, the additive characteristic data determination operation in FIG. 7 is similar to that in FIG. 15. However, the process may differ in that step S401 is performed by the opposing radio station 30 and steps S402 and S403 are performed by the radio station 20. More specifically, after the additive characteristic data is determined in step S305, the additive characteristic data report signal generation unit 305 generates the report signal including the information on the additive characteristic data, and the generated report signal is transmitted to the radio station 20 to report the information (step S401). Upon receiving the report signal (step S402), the repot signal decoding unit 207 of the radio station 20 decodes the report signal to obtain the information on the additive characteristic data from the decoding result. Then, based on the information, the additive characteristic data control signal is generated (step S403).

In this configuration, due to the demodulation process demodulating the report signal transmitted from the opposing radio station 30 to the radio station 20, the load of the radio station 20 may be increased. However, in this modification, since the decoding method can be used, it may become possible to more accurately transmit the information on the additive characteristic data and perform highly-accurate interference control while excluding the influence on the communication path that would otherwise interfere the receiving signal.

When the decoding result is not required to be used, it is not necessary for the radio station 20 to have a signal encoding function. In a case where a base station communicates with a terminal, and the opposing radio station serves as the base station and the radio station serves as the terminal, the function of the terminal may be reduced. By doing this, it may become relatively easier to reduce the size and cost of the terminal. However, when a quality of the transmission path is not good, the accuracy of the control may be degraded, which may cause the degradation of the frequency use efficiency. In contrast, when such decoding result may be used as in this first modification, for example, information of so-called transmission beam control may be used. The number of functions of the radio station may be increased due to the addition of the decoding. This may not be preferable from the viewpoint of reducing the size of the radio station. However, by having the decoding function, it may become possible to perform highly-accurate interference control may be performed regardless of the communication environment; thereby enabling enhancing the frequency use efficiency.

2.5.2 Second Modification

Figure 18:
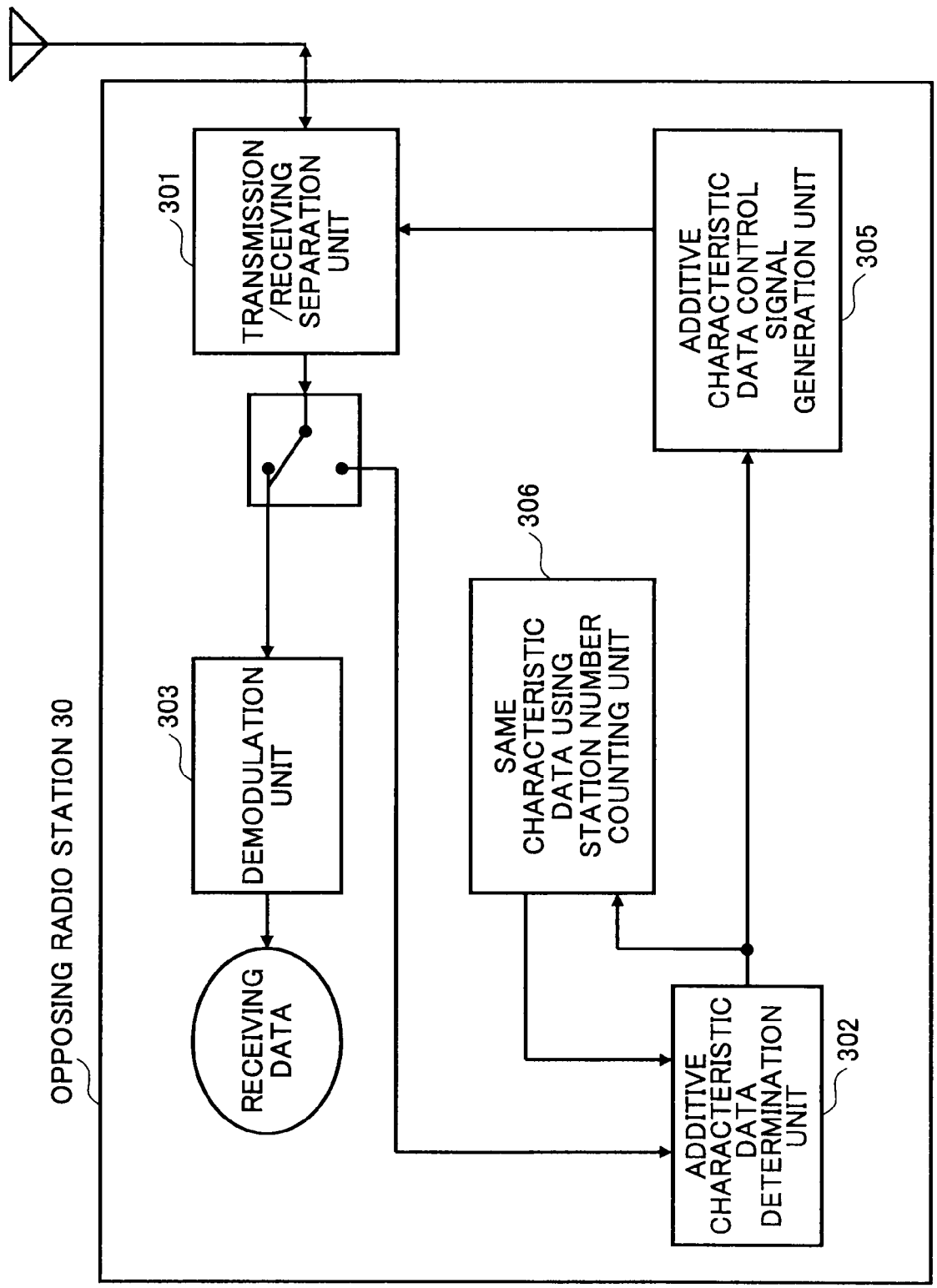
FIG. 18 is a block diagram showing an exemplary functional configuration of the opposing radio station of a radio communication system according to a second modification of the second embodiment of the present invention.

FIG. 18 is a block diagram showing an exemplary functional configuration of the opposing radio station of a radio communication system according to a second modification of the second embodiment of the present invention. As shown in FIG. 18, the configuration in the second modification differs from that in the second embodiment in that there is provided a same characteristic data using station number counting unit 306. Whenever the additive characteristic data determination unit 302 of the opposing radio station 30 allocates (reports) a new additive characteristic data to the radio station, the same characteristic data using station number counting unit 306 counts and stores the number of radio station using the characteristic data newly reported by the opposing radio station 30. By having this configuration, it may become possible for the opposing radio station to know which characteristic data is used in which radio station and that the number of nearby radio stations having the same additive characteristic data for each additive characteristic data.

Figure 20:
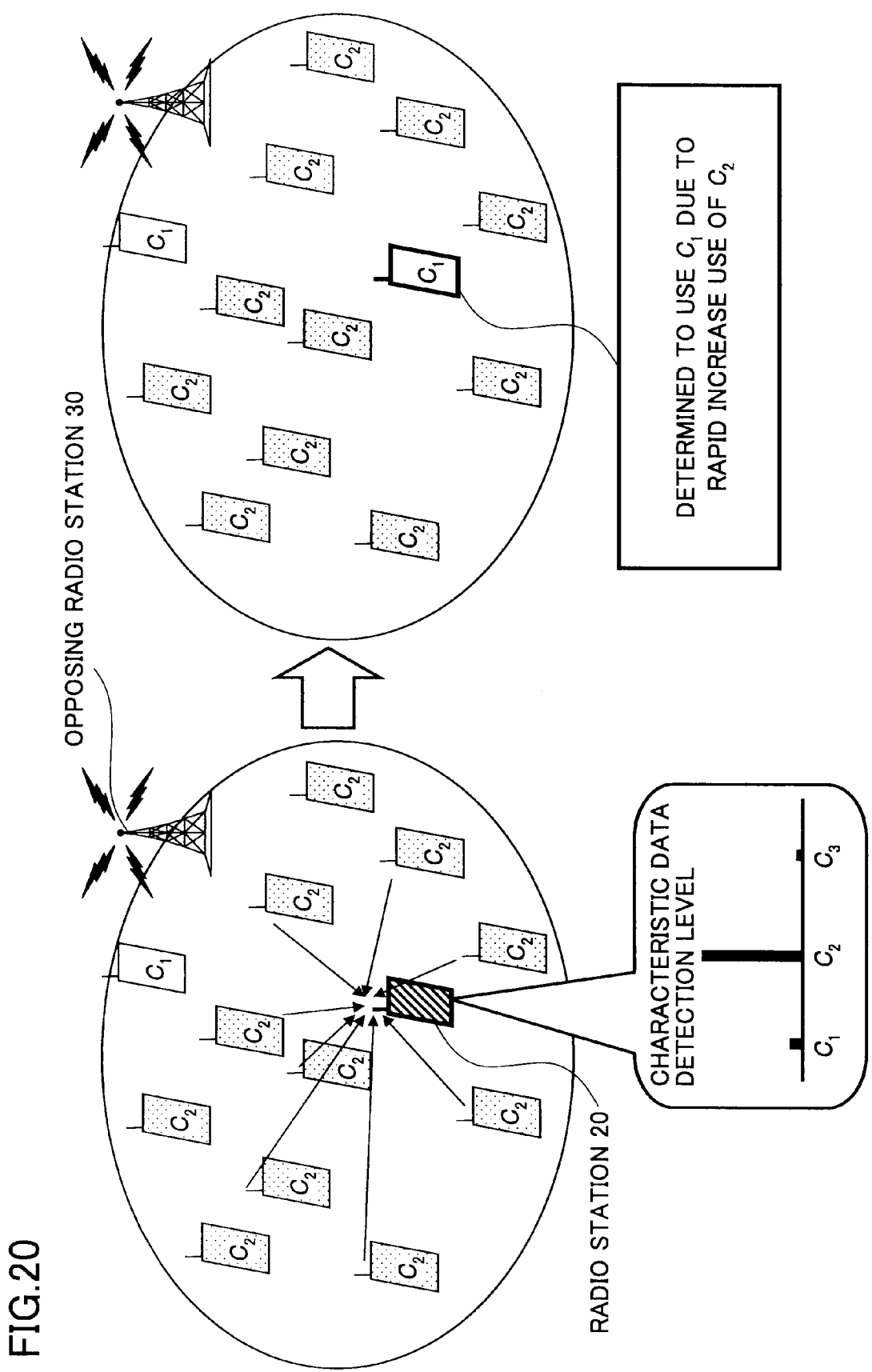
FIG. 20 is a drawing showing a concept and an effect of determining the additive characteristic data according to the second modification of the second embodiment of the present invention.

FIG. 19 is a conceptual table showing the data counted and stored by the opposing radio station 30. In FIG. 19, a symbol $N(C_i)$ denotes the number of radio stations using the additive characteristic data $C_i$. When allocating (reporting) a new additive characteristic data to the radio station, the additive characteristic data determination unit 302 of the opposing radio station 30 determines the additive characteristic data using the number of radio stations ($N(C_i)$) using the additive characteristic data $C_1$. In the example of FIG. 20, when the number of radio stations 20 using a specified additive characteristic data $C_2$ is equal to or greater than a predetermined number from among the radio stations 20 located nearby the opposing radio station 30, a characteristic data other than $C_2$ is used (selected) to be allocated to a new radio station. By managing (monitoring) the number of each characteristic data, it may become possible to avoid a case where the number of radio stations having the same characteristic data for each characteristic data is equal to or greater than a predetermined number. Further, the association between the characteristic data and a geographical distribution of each radio station may be more determined in more detail by additionally considering the number of radio stations having the same characteristic data, so that highly-accurate interference control may be performed.

2.5.3 Third Modification

Figure 21:
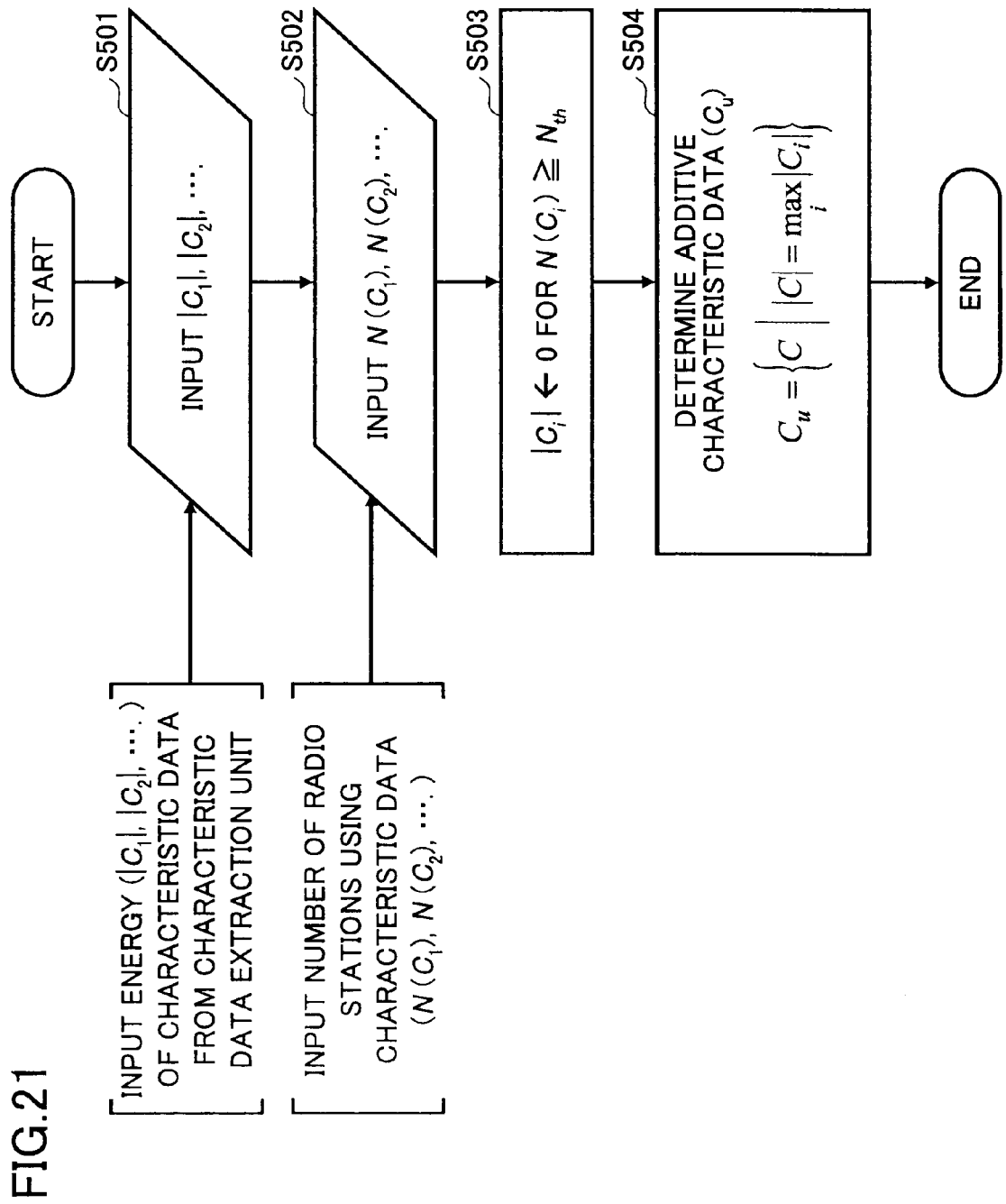
FIG. 21 is a flowchart showing a process of determining the additive characteristic data according to a third modification of the second embodiment of the present invention.

FIG. 21 is a flowchart showing the additive characteristic data determination operation according to the third modification of the second embodiment of the present invention. In this third modification, after receiving the energy of the characteristic data ($|C_i|$) based on collection information (collection information signal) from the radio station 20 (step S501), the additive characteristic data determination unit 302 of the opposing radio station 30 acquires the information on the number of radio stations ($N(C_i)$) corresponding to the additive characteristic data having been allocated by the opposing radio stations 30 before (Step S502).

Then, it is determined whether the number of the radio stations ($N(C_i)$) is equal to or greater than a threshold value ($N_{th}$). When there is any number of radio stations ($N(C_i)$) equal to or greater than a threshold value ($N_{th}$), the energy level of the characteristic data used in the radio stations is forcibly set to zero (0) during the additive characteristic data determination operation (step 503). In this case, the characteristic data is regarded as not having been detected and excluded from the choice of the characteristic data to be selected in the additive characteristic data determination operation. Next, the energy of the characteristic data ($|C_i|$) after step 503 (i.e., excluding characteristic having no energy in step 503) are compared with each other and the characteristic data having the highest energy is selected as the additive characteristic data (step S504).

Figure 22:
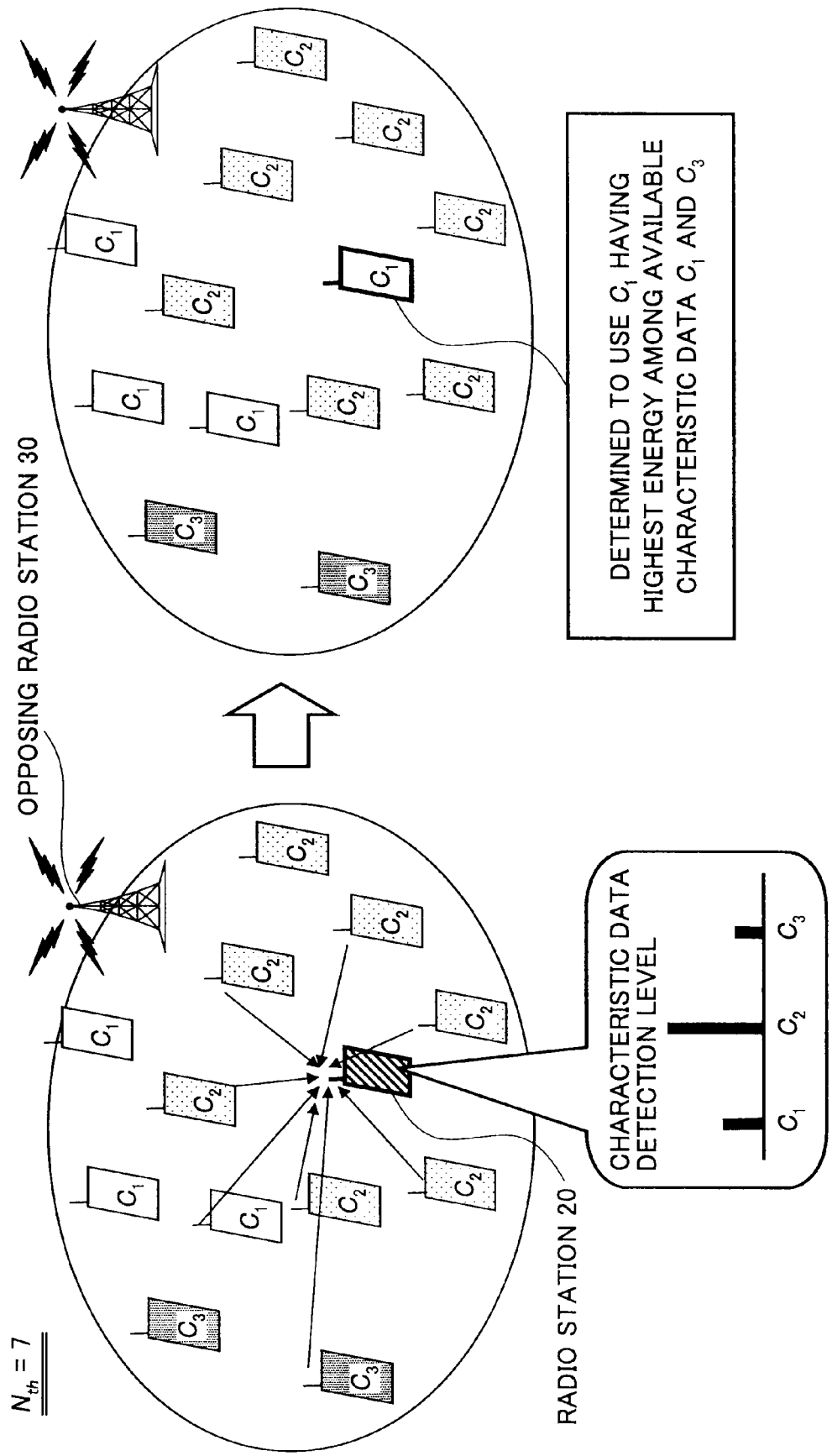
FIG. 22 is a drawing showing a concept and an effect of determining the additive characteristic data according to the third modification of the second embodiment of the present invention.

FIG. 22 shows a concept and an effect of the additive characteristic data determination operation according to the third modification of the second embodiment of the present invention. In the status shown in left side of FIG. 22, there are seven (7) radio stations already using the characteristic data $C_2$ ($N(C_2)$=7). The number of the radio stations is reached at the threshold value ($N_{th}$=7). As a result, the energy of the radio stations having the characteristic data $C_2$ is forcibly set to zero (0). Therefore, in response to the request from the base station 20 to determine the character data to be allocated to the base station 20, the opposing radio station 30 selects the characteristic data $C_1$ or $C_3$ other than the characteristic data $C_2$ as the additive characteristic data to be allocated to the radio station 20. In the specific case of FIG. 22, the energy level of the characteristic data $C_1$ is higher than that of the characteristic data $C_3$. Therefore, characteristic data $C_1$ is selected as the additive characteristic data to be allocated to the radio station 20. By doing in this way, the radio stations using the same characteristic data may be geographically unevenly (locally) distributed while preventing the status where the number of radio stations having the same characteristic data is equal to or greater than a predetermined number.

2.5.4 Fourth Modification

Figure 23:
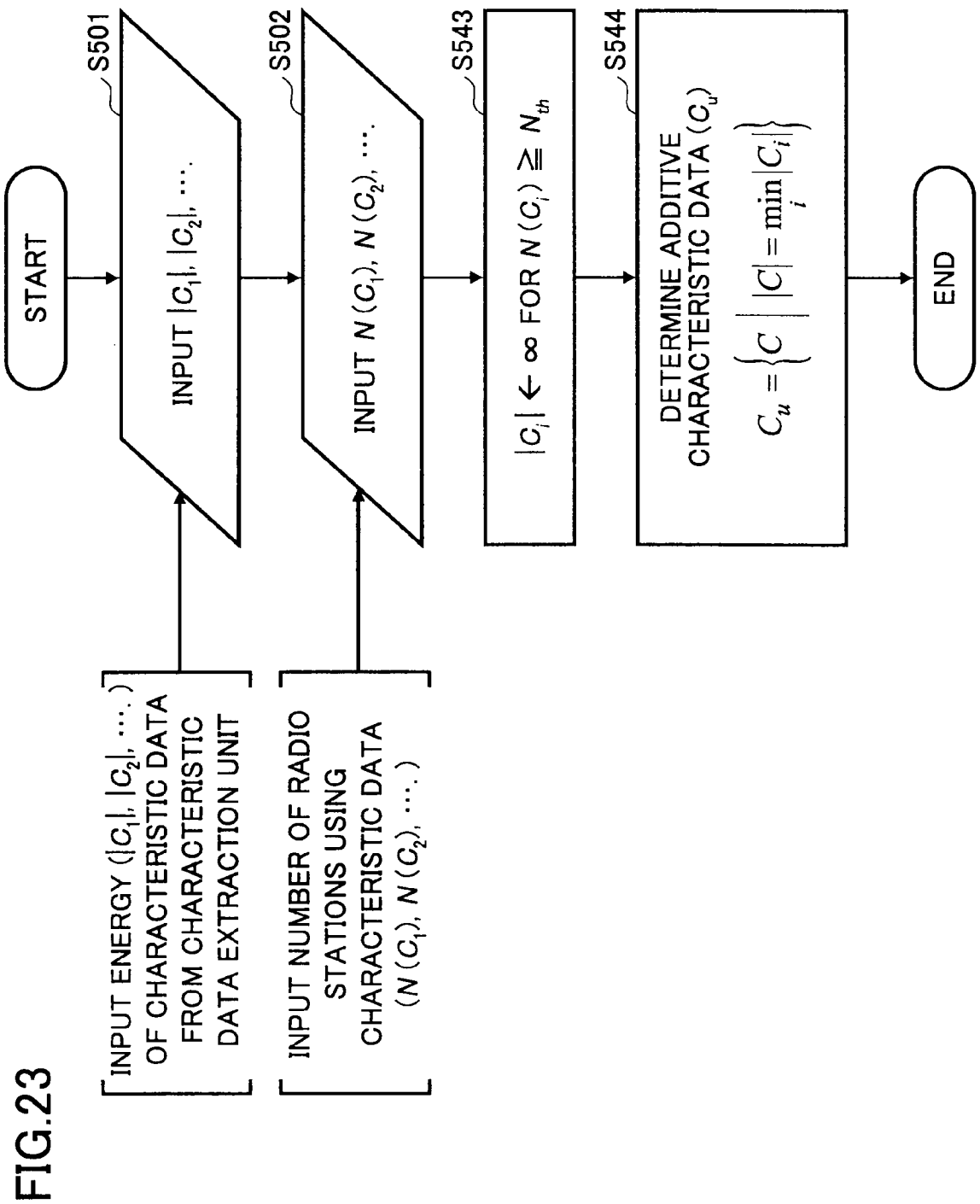
FIG. 23 is a flowchart showing a process of determining the additive characteristic data according to a fourth modification of the second embodiment of the present invention.

FIG. 23 is a flowchart showing the additive characteristic data determination operation according to the fourth modification of the second embodiment of the present invention. The process of the flowchart in FIG. 23 is similar to that in FIG. 21 except the criteria used in selecting the additive characteristic data are different from each other.

In the flowchart of FIG. 23, the process of steps S501 and S502 is the same as that shown FIG. 21. However, in this fourth modification, the process of steps S543 and S544 is performed instead of that of steps S503 and S504 in FIG. 21. In this modification, first, after receiving the energy of the characteristic data ($|C_i|$) based on collection information (collection information signal) from the radio station 20 (step S501), the additive characteristic data determination unit 302 of the opposing radio station 30 acquires the information on the number of radio stations ($N(C_i)$) corresponding to the additive characteristic data having been allocated by the opposing radio stations 30 before (Step S502).

Then, it is determined whether the number of the radio stations ($N(C_i)$) is equal to or greater than a threshold value ($N_{th}$). When there is any number of radio stations ($N(C_i)$) equal to or greater than a threshold value ($N_{th}$), the energy level of the characteristic data used in the radio stations is forcibly set to infinity ($\infty$) during the additive characteristic data determination operation (step 543). In this case, the characteristic data is regarded as having been too strongly detected and excluded from the choice of the characteristic data to be selected in the additive characteristic data determination operation. Next, the energy of the characteristic data ($|C_i|$) after step 503 (i.e., excluding characteristic having infinity energy in step 503) are compared with each other and the characteristic data having the lowest energy is selected as the additive characteristic data (step S544).

Figure 24:
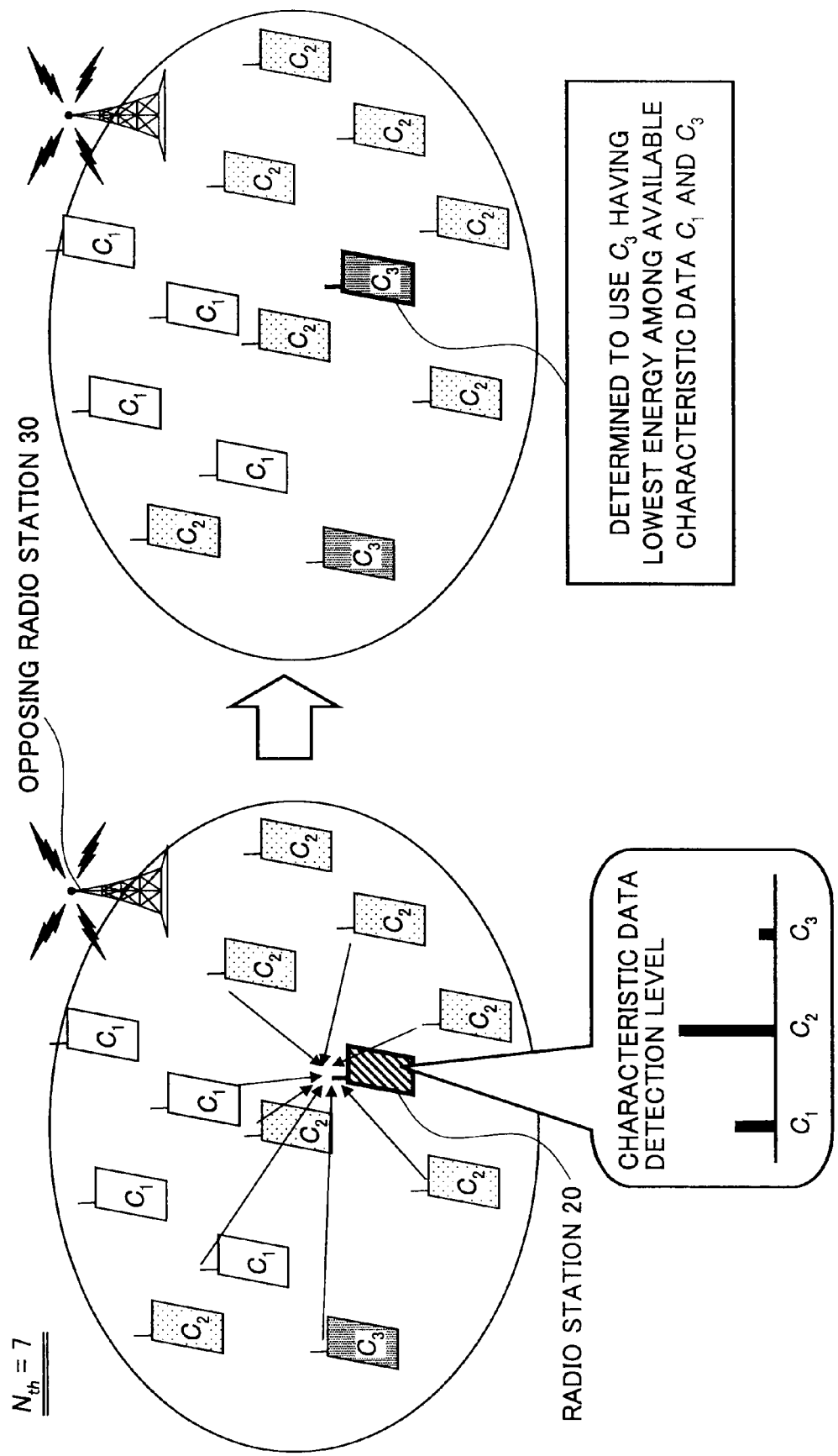
FIG. 24 is a drawing showing a concept and an effect of determining the additive characteristic data according to the fourth modification of the second embodiment of the present invention.

FIG. 24 shows a concept and an effect of the additive characteristic data determination operation according to the fourth modification of the second embodiment of the present invention. In the status shown in left side of FIG. 24, there are seven (7) radio stations already using the characteristic data $C_2$ ($N(C_2)$=7). The number of the radio stations is reached at the threshold value ($N_{th}$=7). As a result, the energy of the radio stations having the characteristic data $C_2$ is forcibly set to infinity ($\infty$). Therefore, in response to the request from the base station 20 to determine the character data to be allocated to the base station 20, the opposing radio station 30 selects the characteristic data $C_1$ or $C_3$ other than the characteristic data $C_2$ as the additive characteristic data to be allocated to the radio station 20. In the specific case of FIG. 24, the energy level of the characteristic data $C_3$ is lower than that of the characteristic data $C_1$. Therefore, characteristic data $C_3$ is selected as the additive characteristic data to be allocated to the radio station 20. By doing in this way, the radio stations using the same characteristic data may be geographically dispersedly distributed and communications of high-priority communications may be ensured while preventing the status where the number of radio stations having the same characteristic data is equal to or greater than a predetermined number.

2.5.5 Fifth Modification

Figure 25:
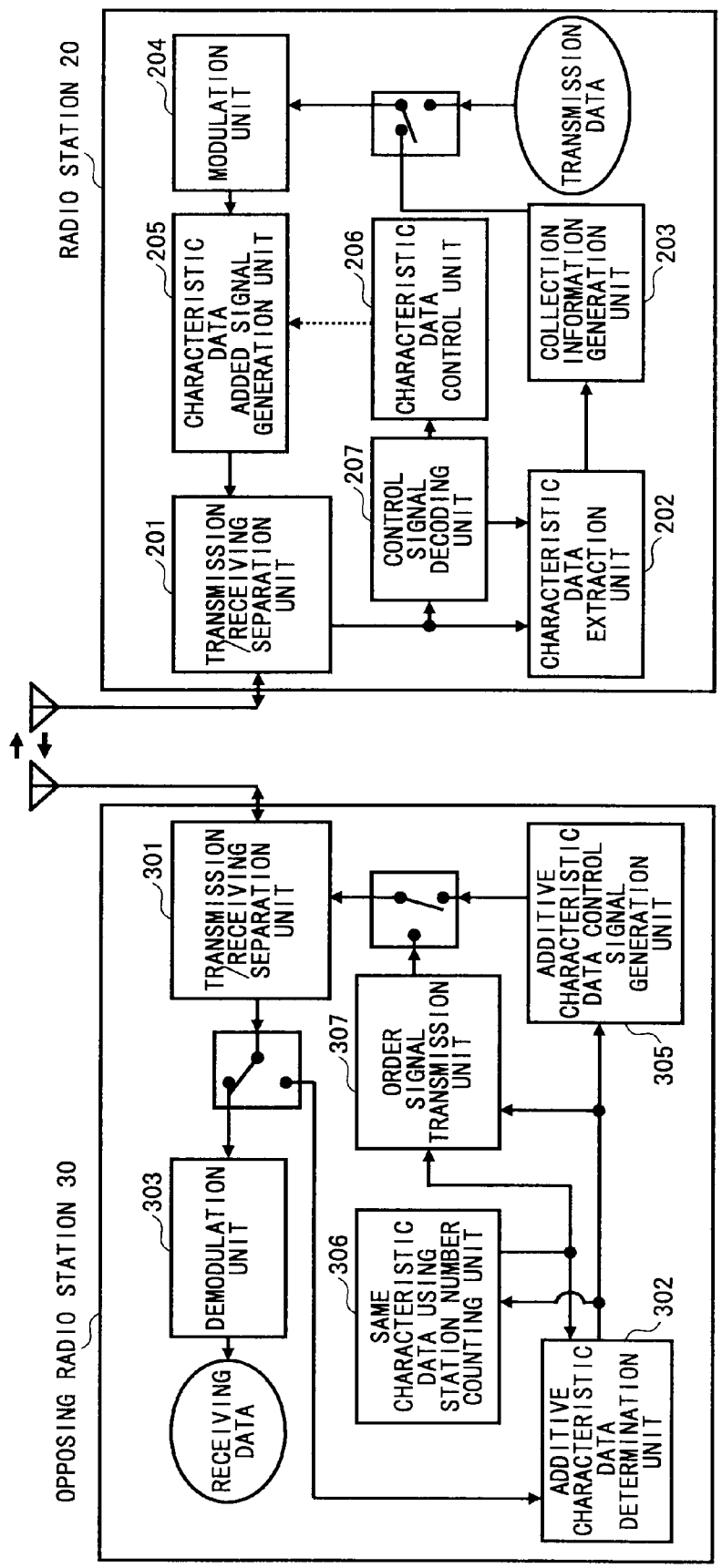
FIG. 25 is a block diagram showing an exemplary functional configuration of the radio station and the opposing radio station of a radio communication system according to a fifth modification of the second embodiment of the present invention.

FIG. 25 is a block diagram showing an exemplary functional configuration of the radio station and the opposing radio station of a radio communication system according to the fifth modification of the second embodiment of the present invention. As shown in FIG. 25, the configuration in the fifth modification is similar to the combination of the configuration of the radio station 20 in FIG. 16 and that of the opposing radio station 30 in FIG. 18, excepting that there is provided an order signal transmission unit 307 in the configuration of FIG. 25.

The order signal transmission unit 307 specifies (recognizes) the information of the additive characteristic data ($C_u$) of the radio station determined by the additive characteristic data determination unit 302, and the number of radio stations ($N(C_u)$) using the additive characteristic data. Further, when the additive characteristic data ($C_u$) is newly allocated to the radio station 20, the order signal transmission unit 307 specifies (recognizes) the number of radio stations using the additive characteristic data ($C_u$) (i.e. $N(C_u)+1$). For example, when the number of radio stations exceeds a predetermined number, the opposing radio station 30 generates and transmits an order signal to cause the nearby radio stations to measure and send a report of the characteristic data again. Upon receiving the order signal, the radio station 20 decode the order signal to determine whether the received signal is the order signal. The radio station 20 uses the characteristic data extraction unit 202 to detect (extract) the characteristic data of the received signals from the nearby radio stations, and report the result of the re-detection as collection information to the opposing radio station 30.

Further, by proving a dedicated characteristic data for the order signal and using an order signal with the dedicated characteristic data, the characteristic data extraction unit 202 may detect that the received signal is the order signal, and re-detection of the characteristic data may be performed without decoding the order signal as described above.

Figure 26:
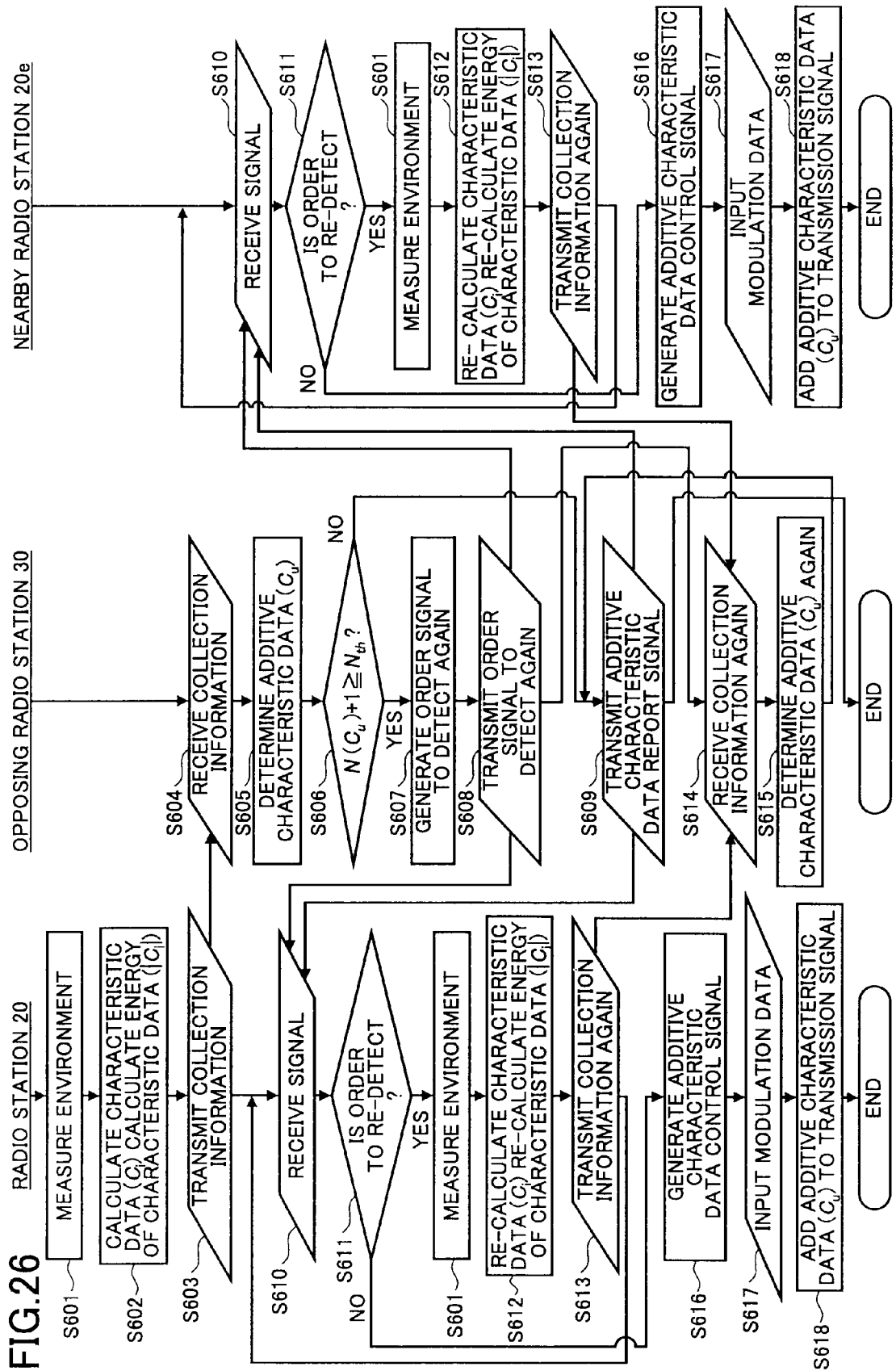
FIG. 26 is a flowchart showing a process of determining the additive characteristic data according to the fifth modification of the second embodiment of the present invention.

FIG. 26 is a flowchart showing the additive characteristic data determination operation according to the fifth modification of the second embodiment of the present invention. As shown in FIG. 26, first, the radio station 20 measures surrounding environment by receiving signals transmitted from nearby radio stations via an antenna (step S601).

The characteristic data extraction unit 202 calculates predetermined characteristic data ($C_i$:i=1,2, . . . ) of the received signal, and further calculates the energy of the characteristic data ($|C_i|$) in the received signal (step S602).

Based on the calculation result, the collection information generation unit 203 generates the collection information. The collection information is modulated by the modulation unit 204. Then, the collection information is converted into a signal in a radio signal format by the characteristic data added signal generation unit 205. In this case, the characteristic data added signal generation unit 205 may add the characteristic data to the signal in the radio signal format. Then the signal including the collection information (collection information signal) is transmitted to the opposing radio station 30 (step S603).

Upon receiving the signal including the collection information (collection information signal) from the radio station 20 (step S604), the additive characteristic data determination unit 302 of the opposing radio station 30 determines the additive characteristic data ($C_u$) (step S605). In this case, similar to the first embodiment of the present invention, as the method of determining the additive characteristic data ($C_u$), any of the methods shown in FIGS. 6, 10, and 12 may be used.

When the additive characteristic data ($C_u$) is newly allocated to the radio station 20, the order signal transmission unit 307 calculates (recognizes) the total number of radio stations using the additive characteristic data ($C_u$) (i.e. $N(C_u)+1$). Further, the order signal transmission unit 307 determines whether the total number is equal to or greater than the threshold value ($N_{th}$) (step S606).

When determining that the total number exceeds the threshold value ($N_{th}$), the opposing radio station 30 generates an re-detection order signal (step S607), and transmits the re-detection order signal to the radio stations using the additive characteristic data near the opposing radio station 30 (step S608).

On the other hand, in step S606, when determining that the total number is equal to or less than the threshold value ($N_{th}$), even the additive characteristic data is newly allocated to the radio station, unacceptable interference may not occur. Therefore, the additive characteristic data report signal generation unit 305 generates the report signal including the information on the additive characteristic data, and the generated report signal is transmitted to the radio station 20 to report the information (step S609).

Upon receiving the report signal from the opposing radio station 30 (step S610), the radio station 20 and the radio stations near the opposing radio station 30 determines whether the received signal (report signal) is the order signal (step S611).

When determining that the received signal (report signal) is the order signal, similar to step S601, surrounding environment is measured, and the characteristic data ($C_i$:i=1,2, . . . ) of the received signal, and the energy of the characteristic data ($|C_i|$) in the received signal are re-calculated (step S612). Then, the collection information based on the re-calculation is transmitted to the opposing radio station 30 (step S613).

Upon receiving the collection information (step S614), the opposing radio station 30 determines the additive characteristic data of the radio stations having reported the collection information (step S615), and transmits the additive characteristic data report signal to the respective radio stations (step S609).

After receiving the additive characteristic data report signal, the radio station generates the additive characteristic data control signal based on the determined additive characteristic data to control the characteristic data added signal generation unit 205 via the characteristic data control unit 206 (step S616), acquires the generated modulation data signal (step S617), and adds the additive characteristic data to the modulation data signal, the additive characteristic data having been determined by the additive characteristic data determination unit 302 of the opposing radio station 30 (step S618).

As schematically illustrated in FIG. 27, according to the fifth modification, it may become possible to prevent the occurrence of a case where the number of the radio stations using the same characteristic data exceeds the predetermined number, add an appropriate characteristic value to each radio stations near the opposing radio station 30, and perform highly-accurate interference control.

2.5.6 Sixth Modification

The sixth modification relates to the method of determining the additive characteristic data in the above step S615. In the sixth modification, when the characteristic data having the highest energy as the result of re-calculation is different from the characteristic data having the highest energy before the re-calculation, the characteristic data of the radio station may be changed so that the characteristic data having the highest energy as the result of re-calculation is determined as the characteristic data of the radio station. By doing this, when the radio stations are required to be geographically unevenly (locally) distributed, it may become possible to perform re-allocation of characteristic data which may be appropriate at the time point.

2.5.7 Seventh Modification

FIG. 28 shows a concept and an effect of the additive characteristic data determination operation according to the seventh modification of the second embodiment of the present invention. The seventh modification also relates to the method of determining the additive characteristic data in the above step S615. In this seventh modification, for example, a case is considered where the number of radio stations using the same characteristic data (in this case, for example $C_2$) exceeds the predetermined number ($N_{th}$). In this case, it is assumed that the number ($N(C_2)$) of radio stations using the same characteristic data ($C_2$) is the largest number among the numbers of radio stations using the same characteristic data ($C_i$; i=1,2, . . . ). Further, it is assumed that, when the detection level of a characteristic second or third highest, the characteristic data is called "second highest characteristic data" or "third highest characteristic data", respectively. Further, in this case, according to this seventh modification, in addition to the predetermined number ($N_{th}$), there is additionally provided a second predetermined number ($N_{th2}$) which smaller than the predetermined number ($N_{th}$) ($N_{th2} < N_{th}$).

In this seventh modification, the number ($N(C_2)$) of radio stations using the same characteristic data ($C_2$) is divided into two parts: a first part is $N_{th2}$, and a second part is (($N(C_2) - N_{th2}$). Then, from among the ($N(C_2)$) of radio stations using the same characteristic data ($C_2$), in step S615, the characteristic data $C_2$ is allocated to $N_{th2}$ of radio stations and the "second highest characteristic data" is allocated to (($N(C_2) - N_{th2}$) of radio stations. By allocating the characteristic data in this way, it may become possible to average the numbers of radio stations having the same characteristic data (i.e, reduce the differences among the numbers of the radio stations having the same characteristic data) and locate (dispose) the radio stations having the same characteristic data in a manner such that the radio stations are geographically unevenly (locally) distributed.

Further, before performing this step in the seventh modification, when the characteristic data having the highest energy as the result of re-calculation is different from the characteristic data having the highest energy before the re-calculation, the characteristic data of the radio station may be changed so that the characteristic data having the highest energy as the result of re-calculation is determined as the characteristic data of the radio station. By additionally doing this, it may become possible to determine the characteristic data more appropriately.

Further, in step S615, for example, after calculating the energy level of the characteristic data ($C_1$ and $C_3$) other than the characteristic data ($C_2$) as described above, the characteristic data $C_2$ is allocated to $N_{th2}$ of radio stations and the characteristic data ($C_1$ and $C_3$) are allocated to (($N(C_2) - N_{th2}$) of radio stations. By allocating the characteristic data in this way, when there is a radio station detecting characteristic data other than the characteristic data currently used by the radio station, it may become possible to allocate other characteristic data to the radio station. As a result, it may become possible to average the numbers of radio stations having the same characteristic data (i.e, reduce the differences among the numbers of the radio stations having the same characteristic data).

Further, in step S615, for example, a ratio of the energy level may be calculated of the characteristic data of the radio stations, the number of the radio stations exceeds the predetermined number ($N_{th}$) (hereinafter referred to as "first characteristic data") to the energy level of the characteristic data other than the first characteristic data (hereinafter referred to as "second characteristic data") (i.e., a ratio (energy level of the first characteristics data)/(energy level of the second characteristics data) may be calculated), so that the calculated ratio may be used. In this case, after comparing the energy levels of all the first characteristic data, the second predetermined number ($N_{th2}$) of radio stations having higher energy levels. Then, the first characteristic data are allocated to the selected second predetermined number ($N_{th2}$) of radio stations, and other characteristic data having the higher energy level is allocated to the rest of the radio stations. By doing this, it may become possible to avoid a situation where the additive characteristic data is changed simply because the energy of the second characteristic data is relatively strongly detected by the radio station in a certain area even though the first characteristic data is very strongly detected. Further, when the energy level of the second characteristic data is detected higher than that of the first characteristic data by a radio station, it may become possible to allocate the second characteristic data to the radio station. Therefore, the radio stations having the same characteristic data may be geographically unevenly (locally) distributed while averaging the numbers of radio stations using the same characteristic data.

In the above operations, the re-detection control is transmitted to only the radio stations using the additive characteristic data, the number of the radio stations using the additive characteristic data exceeding the predetermined number. However, the re-detection may also be performed by the radio stations, the number of the radio station using the characteristic data exceeding a third predetermined number. By doing in this way, it may become possible to avoid the situation where the change of the additive characteristic provokes the re-detection operations using other characteristic data. Thereby, it may become possible to stabilize the interference control operation, preventing the situation where the control doe not converge.

In this embodiment, the predetermined number may be determined based on a total number of radio stations that communicate with the opposing radio station 30 and a number of types of the characteristic data to be added in the radio communication system. For example, as the predetermined number, a value may be used which is obtained by adding a margin value to a value obtained by dividing the number of radio stations that communicate with the opposing radio stations 30 by the number of types of the characteristic data. Herein, the number of radio stations that communicate with the opposing radio station 30 may be an upper limit value of the number of the radio stations that can be connected to the opposing radio station 30 at the same time, or may be the number of radio stations currently communicating with the opposing radio station 30. By determined in this way, the predetermined number may be flexibly determined depending on the opposing radio station 30 and environment. As a result, the numbers of radio stations using the characteristic data may be effectively averaged in a small area such as an area near the opposing radio station 30.

The present invention may also be used in any appropriate mobile communication system deriving waveform characteristic data to enhance the effective use of the radio resource based on the waveform characteristic data. More specifically, the present invention may be applied to any radio communication system in which when a radio transmission/receiving apparatus adds the characteristic data to a waveform of its transmission signal, and, based on the detection result of the characteristic data, another radio transmission/receiving apparatus allocates usable radio resource, the radio transmission/receiving apparatus may appropriately determine the characteristic data to be added to the waveform of the transmission signal.

Further, according to an embodiment of the present invention, it may become possible to effectively use radio resources based on that characteristic data of the waveform derived from statistical properties of a signal.

The present invention is described above by referring to specific embodiments. However, a person skilled in the art may understand that the above embodiments are described for illustrative purpose only and may think of examples of various modifications, transformations, alterations, changes, and the like. To promote an understanding of the present invention, the specific values are used as examples throughout the description. However, it should be noted that such specific values are just sample values unless otherwise described, and any other appropriate values may be used. To promote an understanding of the present invention, the specific formulas are used as examples throughout the description. However, it should be noted that such specific formulas are just sample values unless otherwise described, and any other appropriate formulas may be used. In the above description, the present invention is described as being divided into several embodiments. However, it should be noted that the division of the present invention into several embodiments is not essential to the present invention. For example, two or more embodiments may be combined on an as-needed basis. For illustrative purposes, the apparatus according to an embodiment of the present invention is described with reference to the functional block diagram. However, such an apparatus may be provided by hardware, software, or a combination thereof. Software may be provided in any appropriate recording medium such as random access memory (RAM), flash memory, read only memory (ROM), EPROM, EEPROM, register, hard disk (HDD), removable disk, CD-ROM, or the like. The present invention is not limited to the embodiments described above, and various modifications, transformations, alteration, exchanges, and the like may be made without departing from the scope and spirit of the present invention.

The present application is based on and claims the benefit of priority of Japanese Patent Application No. 2009-076963, filed on Mar. 26, 2009, the entire contents of which are hereby incorporated herein by reference.

The invention claimed is:

1. A radio communication system including plural radio stations and opposing radio stations wirelessly communicating with the respective plural radio stations, at least one of the plural radio stations comprising:
 a characteristic data extraction unit configured to receive a radio signal from one or more nearby radio stations and calculate characteristic data representing a waveform characteristic indicating statistical properties of the received signal;
 a report signal generation unit configured to collect information of characteristic data for each received signal and generate a report signal including the collected information;
 a signal generation unit configured to convert any one of data signal and a signal for radio transmission including the report signal or both into a signal having a format corresponding to the characteristic data determined by the opposing radio station, and generate a transmission signal having the waveform characteristic of the characteristic data; and
 a transmission unit configured to transmit the transmission signal,
 the opposing radio station communicating with the radio station, comprising:
 a characteristic data determination unit configured to determine at least one characteristic data based on one or more characteristic data reported by the report signal;
 a control signal generation unit configured to generate a control signal representing the determined characteristic data; and
 a transmission unit configured to transmit the control signal to the radio station.

2. A radio communication system including plural radio stations and opposing radio stations wirelessly communicating with the plural radio stations, at least one of the plural radio stations comprising:
 a characteristic data extraction unit configured to receive a radio signal from one or more nearby radio stations and calculate characteristic data representing a waveform characteristic indicating statistical properties of the received signal;
 a report signal generation unit configured to collect characteristic data of the received signals and generate a report signal including the collected information;
 a control signal extraction unit configured to decode a control signal received from the opposing radio station and extract information of characteristic data determined by the opposing radio station;
 a signal generation unit configured to convert any one of data signal and a signal for radio transmission including the report signal or both into a signal having a format corresponding to the characteristic data determined by the opposing radio station, and generate a transmission signal having the waveform characteristic of the characteristic data; and
 a transmission unit configured to transmit the transmission signal,
 the opposing radio station communicating with the radio station, comprising:
 a characteristic data determination unit configured to determine at least one characteristic data based on one or more characteristic data reported by the report signal;
 a control signal generation unit configured to generate the control signal representing the determined characteristic data; and
 a transmission unit configured to transmit the control signal to the radio station.

3. The radio communication system according to claim 1 or 2, wherein
 the characteristic data determination unit selects characteristic data having the highest energy level from among one or more calculated characteristic data.

4. The radio communication system according to claim 1 or 2, wherein
 the characteristic data determination unit selects characteristic data having the lowest energy level from among one or more calculated characteristic data.

5. The radio communication system according to claim 1 or 2, the opposing radio station further comprising:
 a station number counting unit configured to count a number of radio stations transmitting a signal having a format corresponding to the characteristic for each of plural characteristic data.

6. The radio communication system according to claim 5, wherein
the characteristic data determination unit selects characteristic data having the highest energy level from among characteristic data corresponding to a radio station, a number of the radio stations being equal to or less than a predetermined number.

7. The radio communication system according to claim 5, wherein
the characteristic data determination unit selects characteristic data having the lowest energy level from among characteristic data corresponding to a radio station, a number of the radio station being equal to or less than a predetermined number.

8. The radio communication system according to claim 5, the opposing radio station further comprising:
an order signal transmission unit configured to, when a number of radio stations corresponding to characteristic data exceeds a predetermined number, transmit an order signal to instruct the radio station to generate and transmit the report signal again, the radio station transmitting a signal having a format corresponding to the characteristic data among plural radio stations communicating with the opposing radio stations.

9. The radio communication system according to claim 8, wherein
when a number of radio stations corresponding to characteristic data exceeds another predetermined number equal to or less than the predetermined number, the order signal transmission unit transmits the order signal to instruct the radio station to generate and transmit the report signal again, the radio station transmitting a signal having a format corresponding to the characteristic data among plural radio stations communicating with the opposing radio stations.

10. The radio communication system according to claim 8, wherein
the characteristic data determination unit selects characteristic data having the highest energy level from among one or more characteristic data that have been reported again.

11. The radio communication system according to claim 8, wherein
the characteristic data determination unit
specifies characteristic data, a number of radio stations corresponding to the characteristic data exceeding a first predetermined number,
compares energy levels of the specified characteristic data among the radio stations,
selects a second predetermined number of radio stations having the highest energy levels from among the radio stations corresponding to the specified characteristic data,
allocates the specified characteristic data to the selected second predetermined number of the radio stations, and
allocates another characteristic data having the highest energy level to radio stations other than the second predetermined number of the radio stations.

12. The radio communication system according to claim 8, wherein
the characteristic data determination unit
specifies characteristic data, a number of radio stations corresponding to the characteristic data exceeding a first predetermined number,
compares energy levels of the specified characteristic data among the radio stations,
selects a second predetermined number of the radio stations having the lowest energy levels from among the radio stations corresponding to the specified characteristic data,
allocates the specified characteristic data to the selected second predetermined number of the radio stations, and
allocates another characteristic data having the highest energy level to radio stations other than the second predetermined number of the radio stations.

13. The radio communication system according to claim 8, wherein
the characteristic data determination unit
specifies first characteristic data, a number of radio stations using the first characteristic data being equal to or greater than a first predetermined number,
specifies second characteristic data other than the first characteristic data, a number of radio stations using the second characteristic data being equal to or less than a second predetermined number,
calculates an energy ratio of an energy level of the first characteristic data to an energy level of the second characteristic data for each radio station,
selects the second predetermined number of radio stations having higher values of the energy ratio from among the radio stations using the first characteristic data,
allocates the first characteristic data to the selected second predetermined number of radio stations, and
allocates characteristic data to radio stations other than the second predetermined number of radio stations, the characteristic data having the highest energy level among the second characteristic data.

14. A radio communication method using in a radio communication system including plural radio stations and opposing radio stations wirelessly communicating with the respective plural radio stations, at least one of the plural radio stations performing the method comprising:
a characteristic data extraction step of receiving a radio signal from one or more nearby radio stations and calculating characteristic data representing a waveform characteristic indicating statistical properties of the received signal;
a report signal generation step of collecting information of characteristic data for each received signal and generating a report signal including the collected information;
a signal generation step of converting any one of data signal and a signal for radio transmission including the report signal or both into a signal having a format corresponding to the characteristic data determined by the opposing radio station, and generating a transmission signal having the waveform characteristic of the characteristic data; and
a transmission step of transmit the transmission signal,
the opposing radio station communicating with the radio station performing the method comprising:
a characteristic data determination step of determining at least one characteristic data based on one or more characteristic data reported by the report signal;
a control signal generation step of generating a control signal representing the determined characteristic data; and
a transmission step of transmitting the control signal to the radio station.

15. A radio communication method including plural radio stations and opposing radio stations wirelessly communicating with the plural radio stations, at least one of the plural radio stations performing the method comprising:

a characteristic data extraction step of receiving a radio signal from one or more nearby radio stations and calculating characteristic data representing a waveform characteristic indicating statistical properties of the received signal;

a report signal generation step of collecting characteristic data of the received signals and generating a report signal including the collected information;

a control signal extraction step of decoding a control signal received from the opposing radio station and extract information of characteristic data determined by the opposing radio station;

a signal generation step of converting any one of data signal and a signal for radio transmission including the report signal or both into a signal having a format corresponding to the characteristic data determined by the opposing radio station, and generating a transmission signal having the waveform characteristic of the characteristic data; and a transmission step of transmitting the transmission signal, the opposing radio station communicating with the radio station performing the method comprising:

a characteristic data determination step of determining at least one characteristic data based on one or more characteristic data reported by the report signal;

a control signal generation step of generating the control signal representing the determined characteristic data; and a transmission step of transmitting the control signal to the radio station.

* * * * *